United States Patent [19]

Jablonowski

[11] 3,996,463
[45] Dec. 7, 1976

[54] METHOD AND APPARATUS FOR MONITORING THE RELATIVE POSITION OF A LIGHT BEAM AND A GRATING USING FRAUNHOFER DIFFRACTION EFFECTS

[75] Inventor: Donald Paul Jablonowski, Hopewell Township, Mercer County, N.J.

[73] Assignee: Western Electric Company, Inc., New York, N.Y.

[22] Filed: Aug. 28, 1975

[21] Appl. No.: 608,821

[52] U.S. Cl. .......................... 250/237 G; 356/169
[51] Int. Cl.² .................................. H01J 39/12
[58] Field of Search ............. 250/237 G; 356/169, 356/170; 219/121 L

[56] References Cited

UNITED STATES PATENTS

| | | | |
|---|---|---|---|
| 3,755,682 | 8/1973 | Russell | 250/237 G |
| 3,759,618 | 9/1973 | Rogers et al. | 250/237 G |
| 3,851,180 | 11/1974 | Kato et al. | 250/237 G |
| 3,867,035 | 2/1975 | Kaul | 356/169 |
| 3,891,321 | 6/1975 | Hock | 356/169 |
| 3,902,036 | 8/1975 | Zaleckas | 219/121 L |
| 3,930,732 | 1/1976 | Holly | 250/578 |

Primary Examiner—Alfred E. Smith
Assistant Examiner—David K. Moore
Attorney, Agent, or Firm—G. D. Green; D. J. Kirk

[57] ABSTRACT

An improved method and apparatus are disclosed for monitoring relative movement between an incident beam of substantially coherent light and a grating on which the beam is directed, wherein light from the beam passing through the grating is sensed by a photodetector, and the cycles in the photodetector output signal are counted. The improvement comprises patterning the beam, transforming the patterned beam into a Fraunhofer diffraction pattern, and further diffracting the Fraunhofer diffraction pattern with the grating to cause an interference image, which is detected by the photodetector. Each two cycles in the output signal of the photodetector then correspond to a relative movement of the beam past one grating period.

28 Claims, 37 Drawing Figures

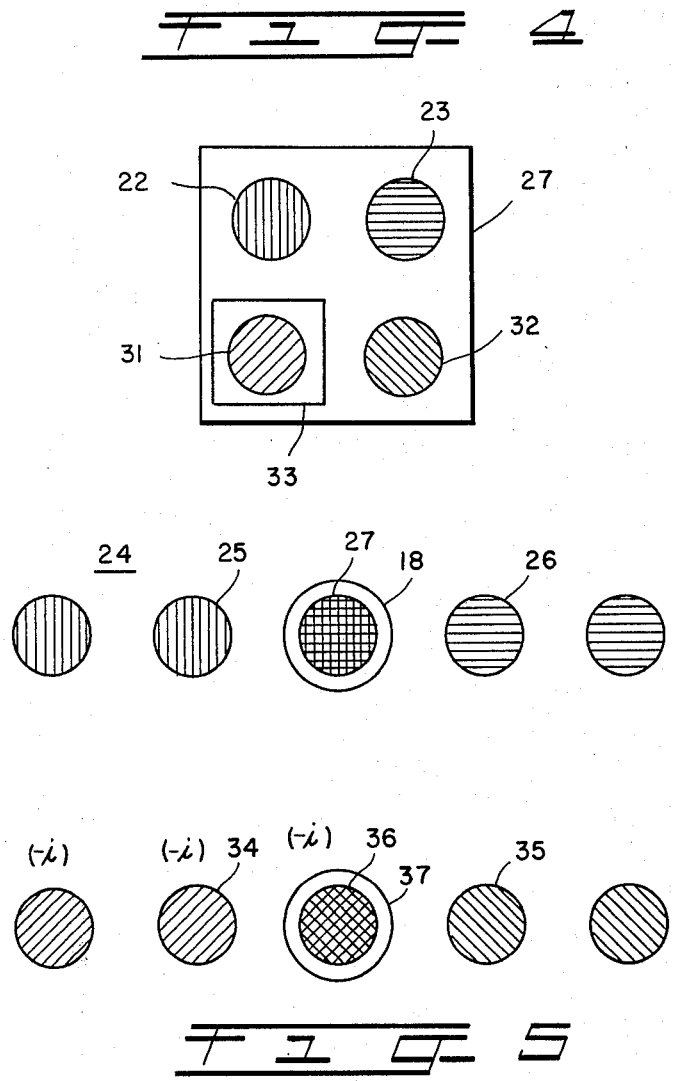
FIG. 4
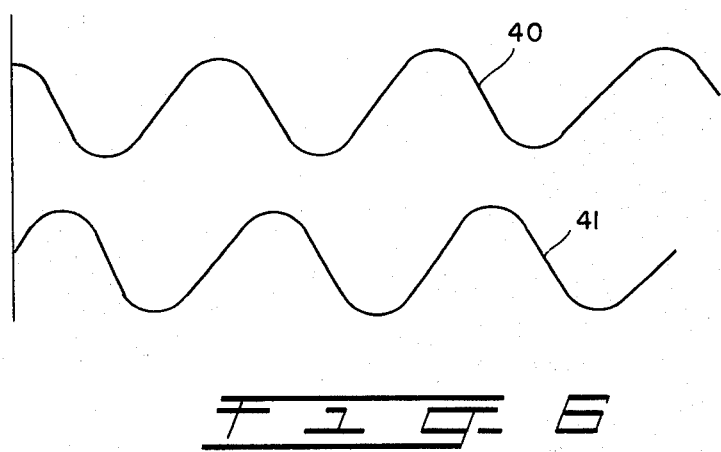
FIG. 5
FIG. 6

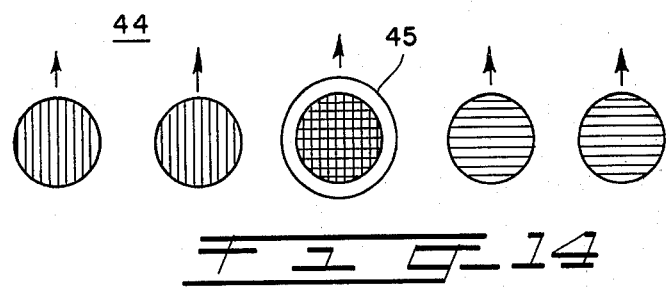
FIG_14
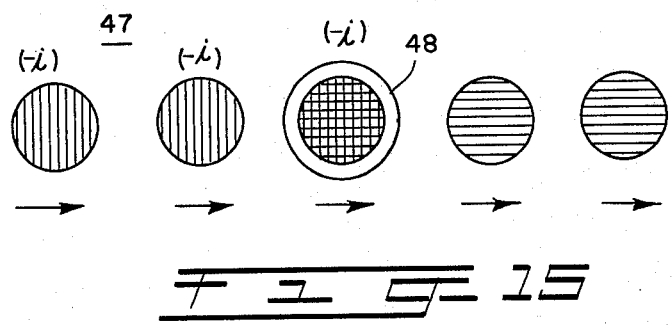
FIG_15
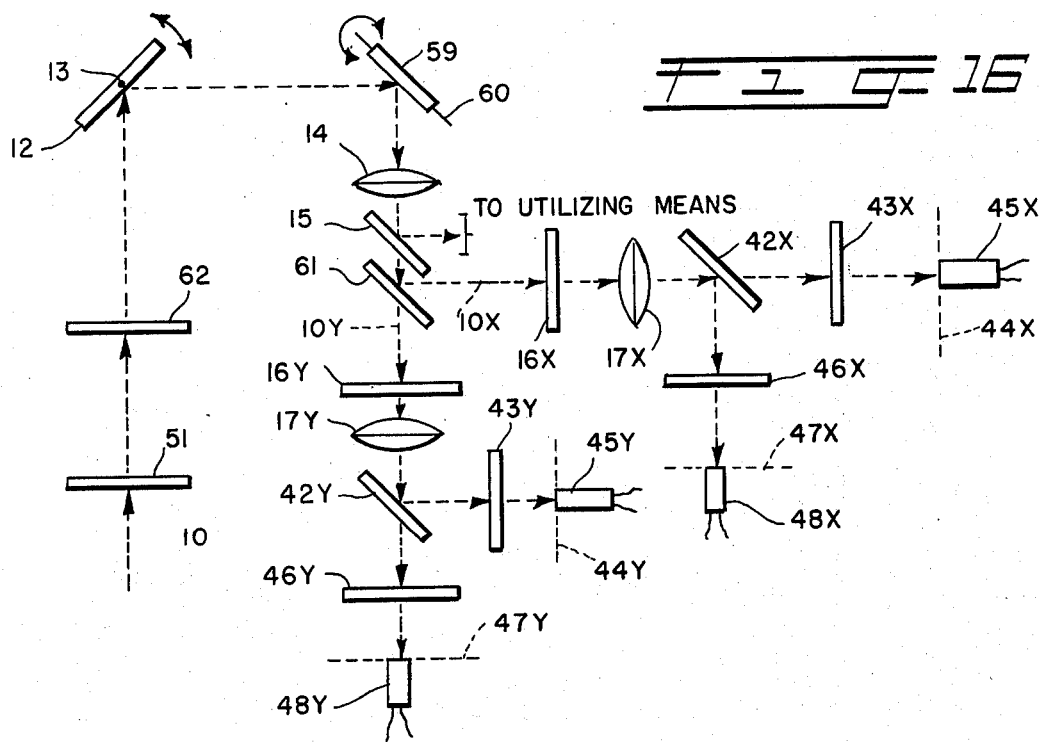
FIG_16

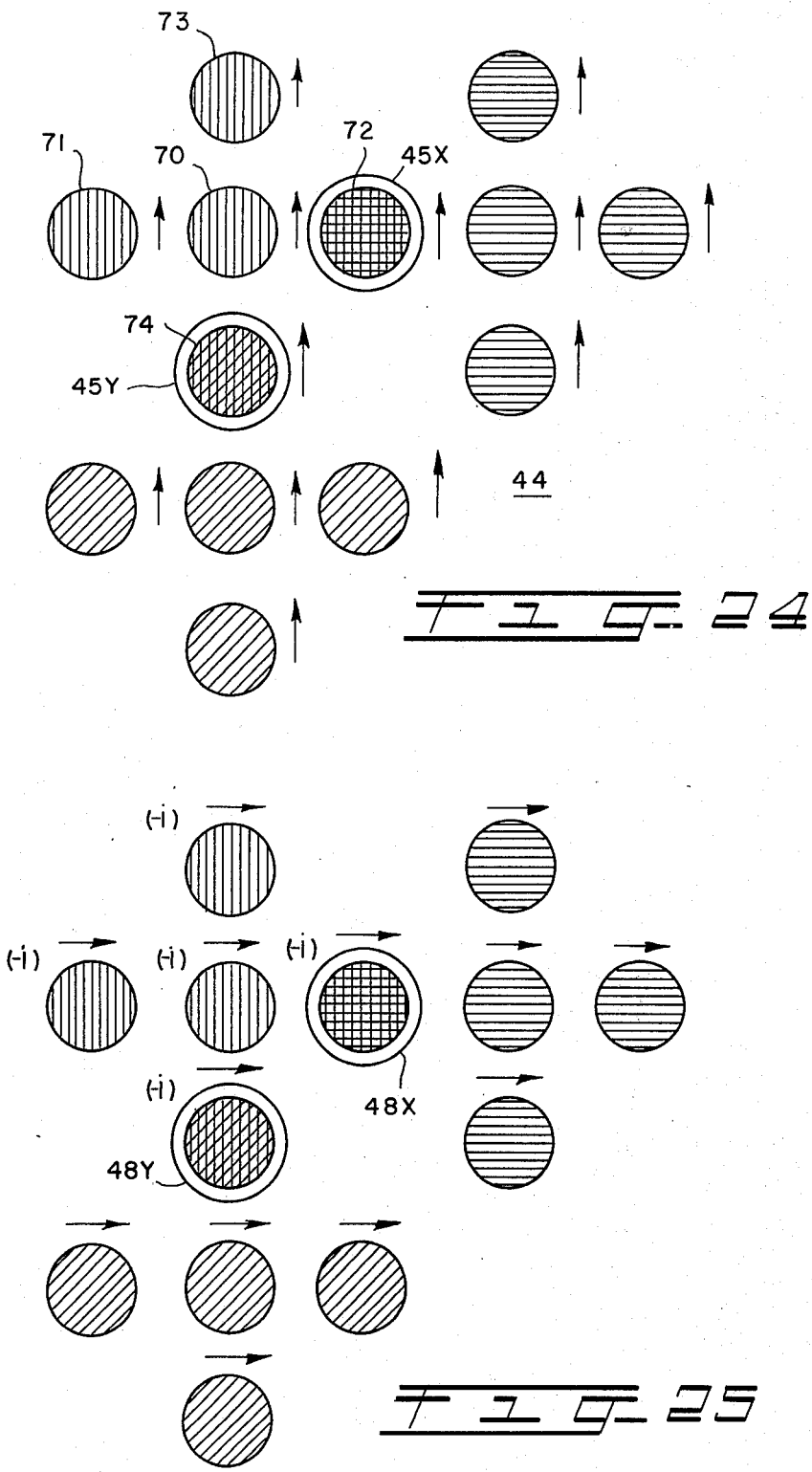

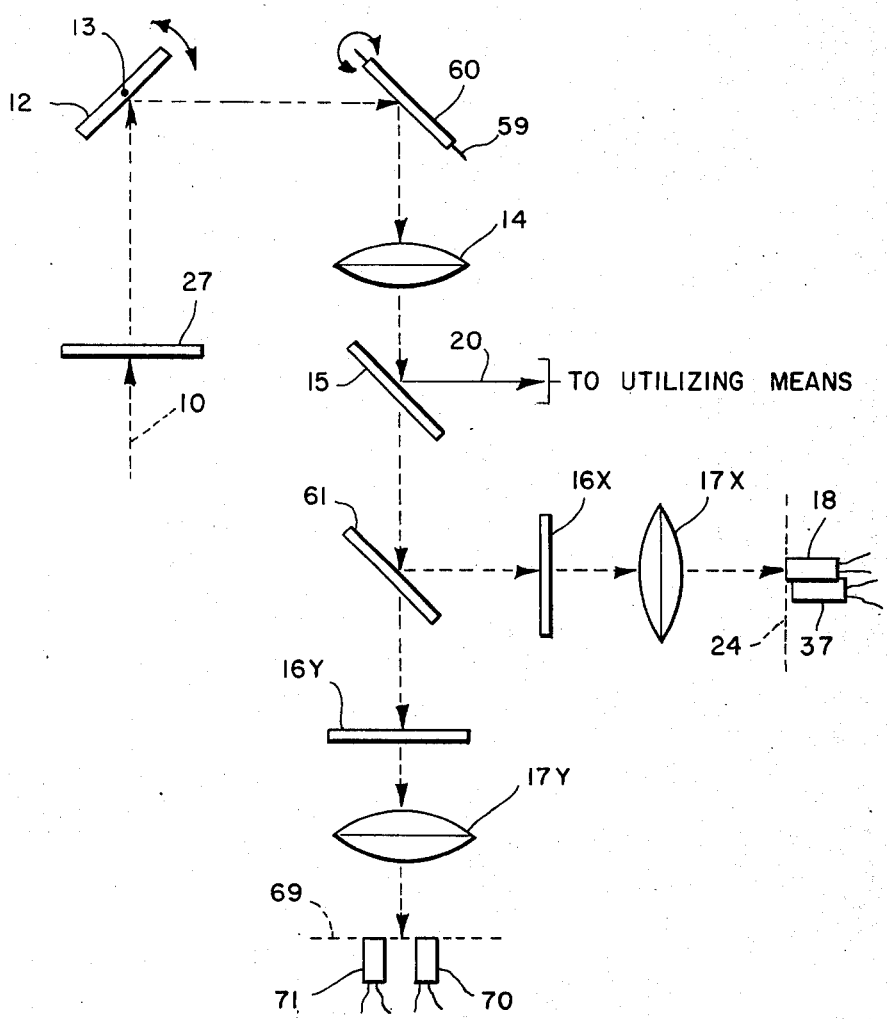

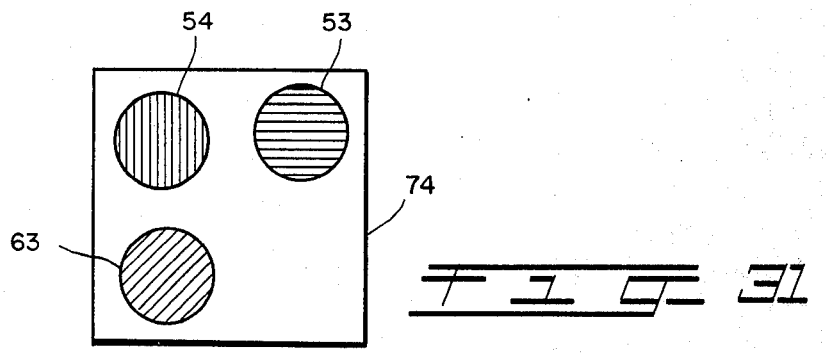
FIG. 31
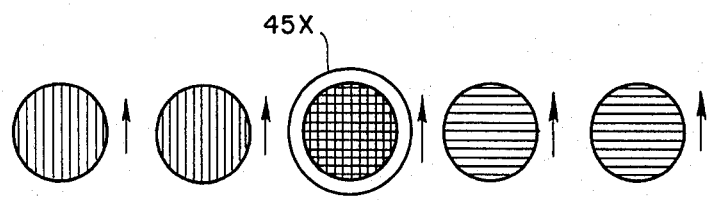
FIG. 32
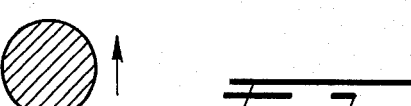
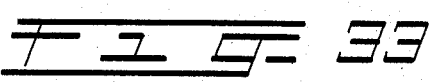
FIG. 33

METHOD AND APPARATUS FOR MONITORING THE RELATIVE POSITION OF A LIGHT BEAM AND A GRATING USING FRAUNHOFER DIFFRACTION EFFECTS

BACKGROUND OF THE INVENTION

1. Field of the Invention

This invention relates to position monitoring systems, and more particularly, to systems for tracking relative movement between a light beam and a grating.

2. Description of the Prior Art

Systems for tracking relative movement between a light beam and a grating are well known. For example, a pattern generator in which a portion of a moving laser beam is directed onto a stationary grating and light from the beam passing through the grating is sensed by a photodetector is illustrated in FIG. 1 of an article by M. J. Cowan et al. entitled "The Primary Pattern Generator Part I — Optical Design," beginning on page 2033 in the issue of the *Bell System Technical Journal* dated November 1970. The grating in this example is alternatively called a code plate. The position of the laser beam is tracked by counting interruptions in the laser beam. A similar system is disclosed in copending application Ser. No. 466,313 of V. J. Zaleckas, filed May 2, 1974, and now U.S. Pat. No. 3,902,036 and assigned to the assignee of this invention, wherein a patterned laser beam is deflected by mirrors rotated by galvanometers. Portions of the pattern are laterally spaced so that one portion is blocked by a line in a grating when the other portion is passed by the grating. Using two photodetectors, two out-of-phase signals are then obtained from which the direction of relative motion between the beam and the grating can be determined.

Systems wherein a grating moves with respect to a stationary light beam are also known. For example, automated machine tools have been built having a grating mounted on a movable worktable and a light beam and a photodetector mounted on a stationary bed, for use in tracking the position of the bed. Again, the beam can be patterned and two photodetectors used to generate out-of-phase signals from which the direction of relative movement can be obtained.

The above systems depend on a light beam being either blocked or passed by the lines in the grating. The light beam must be small enough in diameter in the plane of the grating so that it can be blocked by a grating line, or passed by the space between grating lines. These lines may be spaced as closely as 20μm apart. Defects in a grating or dust on the grating can thus affect the passage of the light beam and cause inaccuracies in the recorded position.

The precision of the above systems is a function of the spacing between the grating lines, and can only be increased by reducing that spacing and reducing the diameter of the incident light beam. There are practical limits to the minimum spacing of grating lines, and these limits prevent more precise systems from being built using the above techniques.

What is desired for use in such systems as those described above is a system for tracking the relative positions of a light beam and a grating that is relatively insensitive to defects in the grating or dust on the grating, and that is capable of higher precision with a given prior art grating.

SUMMARY OF THE INVENTION

The invention relates to improved methods of monitoring relative movement between an incident beam of substantially coherent light and a grating on which the beam is directed, wherein light from the beam passing through the grating is detected by a photodetector and the cycles in the photodetector output signal are counted. In the improved methods, the incident beam is patterned into a number of elements, then transformed into a Fraunhofer diffraction pattern in the plane of the grating. The grating diffracts the transformed beam into various diffraction orders, which are resolved in an image plane. The spacing between the elements in the patterned beam is chosen so that the +1 diffraction order from one of the elements coincides with the −1 diffraction order from another of the elements to form an interference image in the image plane. The photodetector is positioned to detect the interference image.

Various embodiments are disclosed for employing the invention in both one- and two-dimensional systems, and for systems wherein the direction of relative movement between a light beam and a grating is also to be determined. Apparatus is disclosed for implementing the various embodiments of the invention.

These and other aspects of the invention will be apparent from the accompanying drawings and the Detailed Description.

BRIEF DESCRIPTION OF THE DRAWINGS

FIG. 4 illustrates another aperture plate for use in the apparatus of FIG. 1;

FIG. 5 is a diagram of images and photodetectors in an image plane in the apparatus of FIG. 1 having the aperture plate of FIG. 4;

FIG. 6 is a graph of signals from the photodetectors of FIG. 5;

FIGS. 14 and 15 are diagrams of images and photodetectors in image planes in the apparatus of FIG. 11;

FIG. 16 is a schematic representation of apparatus according to the invention for monitoring the position of a light beam that is deflected in two coordinates;

FIGS. 24 and 25 are diagrams of images and photodetectors in image planes in the apparatus of FIG. 22;

FIG. 26 is a schematic representation of another embodiment of apparatus according to the invention for monitoring the position of a light beam that is deflected in two coordinates;

FIG. 31 illustrates an aperture plate for the apparatus of FIG. 30;

FIGS. 32 and 33 are diagrams of light patterns and photodetectors in image planes in the apparatus of FIG. 30;

DETAILED DESCRIPTION

Figure 1:
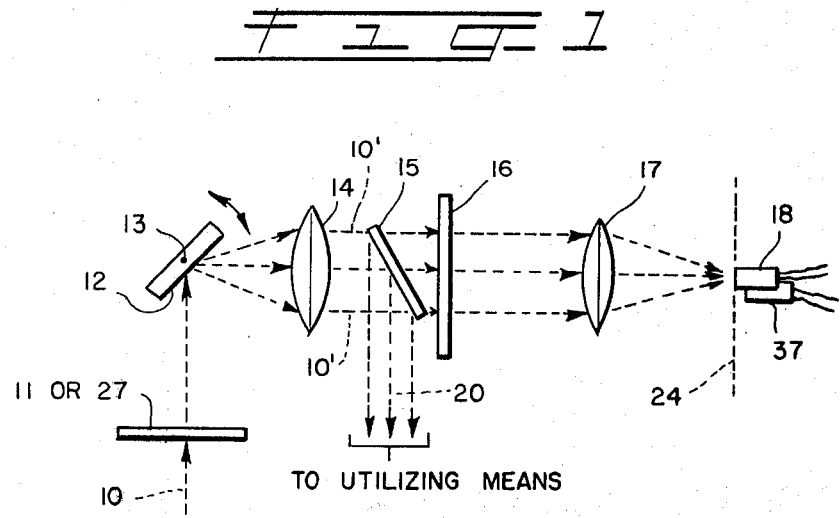
FIG. 1 is a schematic representation of apparatus according to the invention for monitoring the position of a deflected light beam.

Like numerals will be used for like elements in the different figures of the drawing.

FIG. 1 is a schematic representation of exemplary apparatus according to the invention for monitoring the movement of a beam of substantially coherent light with respect to a grating. Beam 10 is directed through aperture plate 11, reflected from mirror 12, which is rotatable around axis 13, and directed through scan lens 14, and beam splitter 15, onto grating 16. Light passing through grating 16 is resolved by collecting lens 17 in image plane 24, where a portion of the image pattern thus formed is sensed by photodetector 18.

Beam 10 can be any substantially coherent light beam, for example, the beam from an HeNe laser having a wavelength of 0.6328μm. Beam 10 can also be a composite of more than one wavelength of light, as will be discussed below.

Mirror 12 is connected to an actuator (not shown), such as a galvanometer, which rotates the mirror around axis 13 to deflect beam 10 in response to a deflection signal applied to the actuator. Many other means for moving beam 10 with respect to grating 16 will be apparent to those skilled in the art.

Scan lens 14 is designed to direct the deflected beam into a path parallel to the axis of the lens, as indicated by dotted lines 10' representing deflected beams. Such a lens, sometimes termed a telecentric lens, is well known in the art.

Beam splitter 15 reflects a portion 20 of beam 10 to utilizing means (not shown), for example, a photosensitive sheet in pattern generating apparatus. The remaining portion of beam 10 is used for monitoring the position of the beam and is directed onto grating 16.

Beam 10 can also be a composite beam, such as is described in the Zaleckas application noted above, wherein a relatively high-powered working beam having one wavelength and a relatively low-powered reference beam having another wavelength are directed along the same path through deflection apparatus, then split by a selective beam splitter to direct the working beam onto a workpiece and the reference beam onto a grating. Such a composite beam is useful for laser machining apparatus where a high-powered, intermittent working beam may be produced by a pulsed laser and a low-powered continuous reference beam may be used to monitor the positions of deflection mirrors, as in the apparatus disclosed by Zaleckas. If such a composite beam were to be used as beam 10 in the apparatus of this invention, then beam splitter 15 would be selective and beam portion 20 would be the intermittent, high-powered beam.

Figure 2:
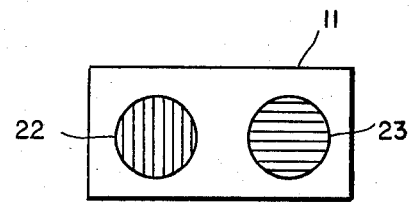
FIG. 2 illustrates an aperture plate for use in the apparatus of FIG. 1.

FIG. 2 illustrates aperture plate 11, which contains two apertures 22 and 23 for patterning the beam into two elements. These apertures are coded with vertical and horizontal shading, respectively, to aid in relating the apertures to their images in an image plane to be described subsequently. Such shading will be used as a convention throughout the disclosure.

In prior art systems wherein a grating is used as a code plate to block or pass a beam, the beam is focused in the plane of the grating to less than the width of a grating line. In the apparatus of the invention, scanning lens 14 and grating 16 are spaced so that scanning lens 14 transforms the patterned beam into a Fraunhofer diffraction pattern in the plane of grating 16 that covers a relatively larger area of the grating than a single grating line. See, for example, the pattern from beam 10 outlined in FIG. 13. Grating 16 diffracts this pattern into various diffraction orders.

Figure 3:
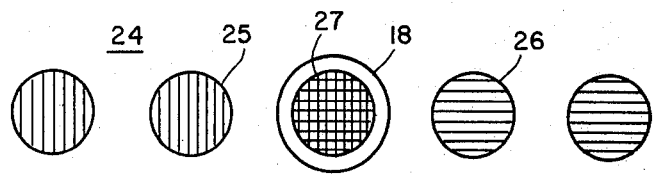
FIG. 3 is a diagram of images and a photodetector in an image plane in the apparatus of FIG. 1 having the aperture plate of FIG. 2.

According to the invention, the spacing between apertures 22 and 23 in aperture plate 11 is chosen so that the +1 and −1 diffraction orders from these apertures coincide when they are resolved in image plane 24 by collecting lens 17. FIG. 3 is a diagram of the principal images resolved in image plane 24 as a result of the interaction of aperture plate 11, grating 16 and lenses 14 and 17. The images remain stationary in the image plane; however, the intensities of the images change cyclically as beam 10 is moved with respect to grating 16. Image 25 is the zero-order from aperture 22; image 26 is the zero-order from aperture 23. Image 27 is an interference image formed by the +1 order from aperture 22 coinciding with the −1 order from aperture 23. Other images resulting from higher diffraction orders that are not important to the invention are not shown in the Figures.

Grating 16 consists of a grid of opaque lines separated by transparent spaces. In the prior art, such gratings are used as code plates to block or pass a light beam. In the positioning apparatus according to the invention, however, grating 16 is used to diffract the Fraunhofer diffraction pattern from a transformed beam that has been patterned into a number of elements by apertures in an aperture plate. Several advantages are thus achieved. For example, the effects of grating defects having sizes comparable to the grid-line spacing are minimized; and, as will be shown, the output signal from a detector positioned to respond to interfering +1 and −1 diffraction orders from different apertures has twice the line grating frequency, therefore providing twice the resolution for a particular grating compared with its resolution when used as a code plate.

This last advantage can be demonstrated mathematically as follows:

For convenience, grating 16 is considered to have a cosine variation. The amplitude transmittance of grating 16, $t_g(x)$, can then be written as $$t_g(x) = \tfrac{1}{2} + \tfrac{1}{2} \cos 2\pi bx \quad (1)$$

where $b$ is the grating periodicity and $x$ is the variable position of beam 10 with respect to the grating. Apertures 22 and 23 in aperture plate 11 are considered to be circular apertures having diameter $c_1$ and spaced a center-to-center distance $d = 2\lambda fb$ apart, where $\lambda$ is the wavelength of the light in the beam and $f$ is the focal length of scan lens 14.

We now examine the light amplitude of the 1 and −1 order elements of the image in plane 24. Light amplitude can be represented as $Ae^{i\phi}$. This amplitude will change as beam 21 is deflected across grating 16. A uniform grating will have a constant diffraction efficiency, and the amplitude term $A$ will remain constant regardless of the position of beam 21. The phase term $e^{i\phi}$, however, will change during the scan.

The quantity $\phi$ is dependent on the position of beam 21 on grating 16. In particular, $\phi$ varies as $$\phi(x) = -2\lambda bx \text{ for the } -1 \text{ order element} \quad (2)$$

and $$\phi(x) = +2\lambda bx \text{ for the } +1 \text{ order element} \quad (3)$$

where $b$ is the periodicity of the grating defined earlier.

When a +1 order from one aperture interferes with the −1 order from another aperture, the total light amplitude $u$ will be the sum of the two interfering orders, viz.

$$u = Ae^{i2\pi bx} + Ae^{-i2\pi bx} \quad (4)$$

Using the identity $$\cos \phi = (e^{i\phi} + e^{-i\phi})/2 \quad (5)$$

equation (4) can be rewritten as $$u = 2A \cos 2\pi bx \quad (6)$$

A photodetector will respond to the intensity of light impinging thereon. Intensity is the square of the absolute value of the amplitude of the light $$I = |u|^2 \quad (7)$$

thus $$I = 4A^2 \cos^2 2\pi bx. \quad (8)$$

Using the identity $$\cos^2 \phi = (1 + \cos 2\phi)/2 \quad (9)$$

equation (8) can be rewritten $$I = 2A^2 (1 + \cos 4\pi bx). \quad (10)$$

Thus, the signal from photodetector 18 exhibits a cosinusoidal variation having twice the periodicity of grating 16 as beam 10 is moved with respect to grating 16.

It can be shown that substantially the same relationship is true if grating 16 has a square-wave variation, which is typically the case.

The ability of the above-described interference method to minimize signal errors caused by grating defects depends upon the size of beam 10 at the grating surface. The size of this beam can be related approximately to aperture size $c$ and aperture spacing $d$ by the expression $$h = 1.22 \ (d/c) \ x_g \quad (11)$$

where $h$ is the pattern size at the grating and $x_g = 1/b$ is the spacing of line pairs on the grating. Because $c < d$, the size of the pattern $h$ is larger than a grid line spacing $x_g$. Thus, any defect having approximately the dimensions of a grid-line spacing does not affect the entire pattern as some of beam 10 is passed and diffracted properly by the grating. If the signal were entirely blocked or passed in the wrong location by a similar defect, as might be the case when the grating is used as a code plate, an error in interpretation of the signal could result. The fact that in the interference method of the invention the pattern size at the grating is larger than such a defect size eliminates this source of error.

To obtain information indicating the direction of movement of the beam with respect to the grating, two out-of-phase signals are required. Such signals and their interpretation are discussed for the prior art, wherein the grating is used as a code plate, in the Zaleckas application referenced above. By using aperture plate 27, shown in FIG. 4, instead of aperture plate 11, two differently phased signals can be produced. Aperture plate 27 comprises apertures 22 and 23 as in aperture plate 11, and also apertures 31 and 32. Aperture 31 is covered with phase plate 33, which retards the portion of beam 10 passing through aperture 31. Therefore, a distinct phase relationship exists among the portions of beam 10 passing through the various apertures. Preferably, phase plate 33 retards light passing through it by $\lambda/4$.

The principal images resolved in image plane 24 from aperture plate 27 are shown in FIG. 5. Again, images 25, 26, and 27 appear, and interference image 27 is detected by photodetector 18. Also images 34, 35, and 36 are present as a result of the portions of beam 10 passing through apertures 31 and 32 in aperture plate 27. Because of the presence of phase plate 33 over aperture 31, light in image 34 will be out of phase with respect to image 35. If phase plate 33 retards light by $\lambda/4$, the variation in intensity of interference image 36, which results from interference between +1 and −1 orders, respectively, from apertures 31 and 32, will be 90° out of phase with the variation in intensity of interference image 27. This can be shown mathematically as follows:

The total light amplitude in element 36 is the sum of the two interfering orders, viz.

$$u = -iAe^{i2\pi bx} + Ae^{-i2\pi bx}. \quad (12)$$

The first term in equation (12) includes the factor $-i$ because the +1 order from aperture 31 is delayed $\lambda/4$ by phase plate 33. Since $u$ is a complex number in equation (12), the intensity $I = |u|^2$ is found by multiplying $u$ by its conjugate $u^*$. Thus $$I = u\, u^* = A^2(-ie^{i2\pi\, bx} + e^{-i2\pi\, bx})(ie^{-i2\pi\, bx} + e^{i2\pi\, bx}) \quad (13)$$

Multiplying and simplifying $$I = A^2[2 - i(e^{i4\pi\, bx} - e^{-i4\pi\, bx})]. \quad (14)$$

Using the identity $$\sin\phi = (e^{i\phi} - e^{-i\phi})/2i \quad (15)$$

equation (14) can be rewritten $$I = 2A^2(1 + \sin 4\pi bx). \quad (16)$$

Contrasting equation (16) with equation (10), it can be seen that the intensity of interference image 36 varies sinusoidally as the intensity of interference image 27 varies cosinusoidally.

FIG. 6 graphically shows the relationship between the signals from photodetectors 18 and 37. Wave 40 is a cosinusoidal signal as generated by photodetector 18, and wave 41 is a sinusoidal signal generated by photodetector 37.

A suitable $\lambda/4$ phase plate 33 for use with an HeNe laser beam having a wavelength $\lambda$ of 0.6328$\mu$m can comprise an optical flat with a MgF coating 4163 Angstrom units thick in one quadrant of the flat.

As will be explained in more detail below, aperture plate 27 can also be used in systems wherein a beam is deflected in two dimensions.

A disadvantage of the direction-determining method described above is that it requires near-diffraction limited performance from scan lens 14 for the phase relationship between the photodetector signals to remain constant. This is because the differently phased portions of beam 10 pass through different portions of scan lens 14, and an aberration in the lens may not affect all portions of the beam equally.

Figure 7:
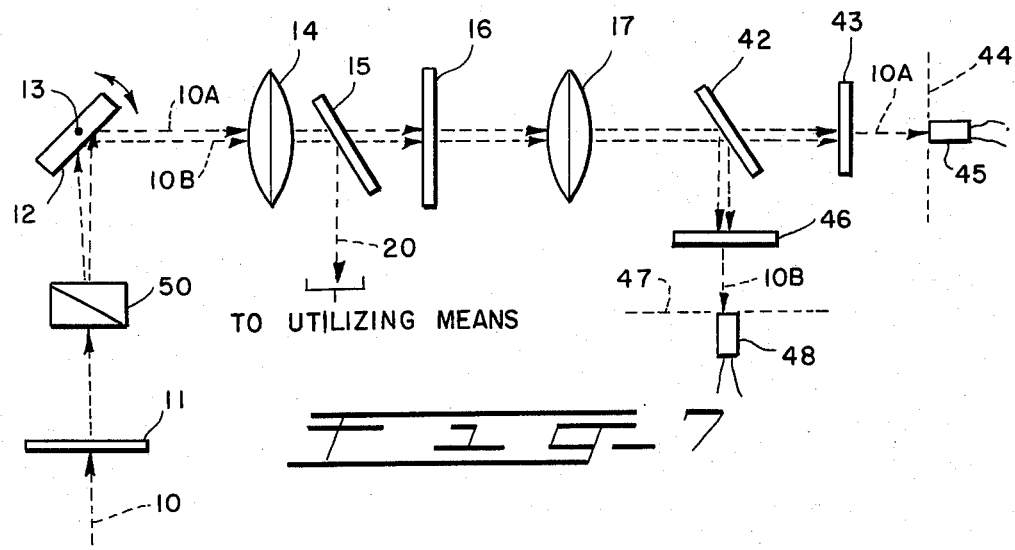
FIG. 7 is a schematic representation of another embodiment of apparatus according to the invention for monitoring the position of a deflected light beam.

FIG. 7 shows another embodiment of the invention that combines the interference method of the invention with a polarization-splitting technique that tends to overcome the disadvantage noted above, and ease the requirements on scan lens 14. In FIG. 7, the apparatus of FIG. 1 is shown modified by the addition of Wollaston prism 50, beam splitter 42, and polarizers 43 and 46.

Wollaston prism 50 divides beam 10, as patterned by aperture plate 11, into two orthogonally polarized, diverging portions 10A and 10B. By proper positioning of the Wollaston prism, the Fraunhofer diffraction patterns from portions 10A and 10B can be made to impinge on grating 16 so that they are separated by one-eighth cycle of the grating periodicity. Thus, the modulation of beam 10A caused by traversing beams 10A and 10B across grating 16 will be 90° out of phase with the modulation caused in beam 10B. Other apparatus, such as a beam splitter and polarizers, can be used instead of Wollaston prism 50 to divide beam 10 into orthogonally polarized, diverging portions.

Figure 8:
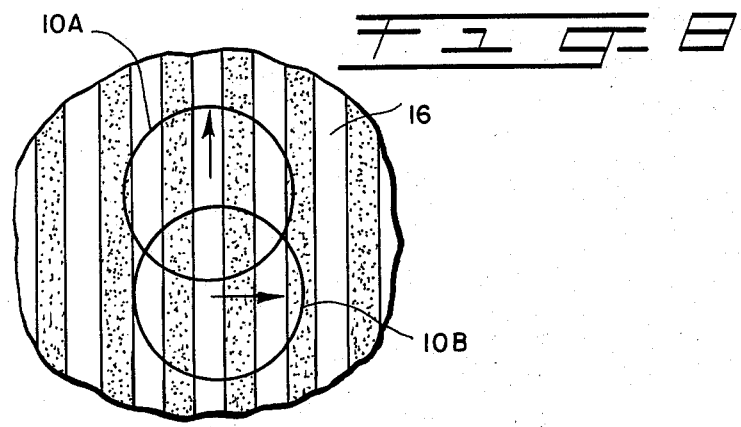
FIG. 8 is a diagram of light patterns in the plane of a grating in the apparatus of FIG. 7.

FIG. 8 shows a portion of grating 16 and the vertically polarized beam 10A and horizontally polarized beam 10B. At the plane of grating 16, the areas of impingement of both beams 10A and 10B are Fraunhofer diffraction patterns because of the transforming action of scanning lens 14. However, it can be seen that the area of impingement of beam 10B is displaced to the right by an eighth cycle of the grating periodicity (one-quarter of a grating-line width) with respect to the area of impingement of beam 10A.

Diffraction orders from both beams 10A and 10B are split by beam splitter 42 so that the split beam portions fall on both vertical polarizer 43 and horizontal polarizer 46. Thus, the vertically polarized beam 10A passes through vertical polarizer 43 and is resolved in image plane 44; and the horizontally polarized beam 10B passes through horizontal polarizer 46 and is resolved in image plane 47.

Figure 9:
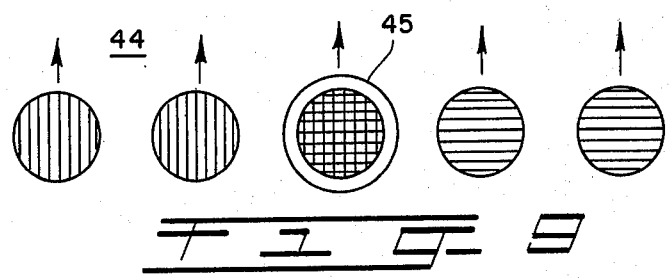
FIG. 9 and 10 are diagrams of images and photodetectors in image planes in the apparatus of FIG. 7.
Figure 10:
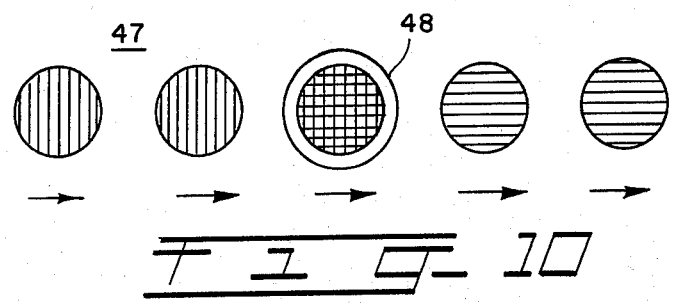

FIG. 9 illustrates the principal images resolved in image plane 44 and FIG. 10 illustrates the principal images resolved in image plane 47. Both sets of images are similar to those shown previously in FIG. 3, that is, a zero-order image for each aperture in aperture plate 11 and interference images from the two apertures Photodetector 45 and photodetector 48 are shown in FIG. 9 and 10 respectively positioned to sense the interference images.

Because of the offset of beams 10A and 10B with respect to the grating, as shown in FIG. 8, the intensity variations sensed by photodetectors 45 and 48 as beams 10A and 10B move across the grating are out of phase, thus providing the necessary directional information.

Figure 11:
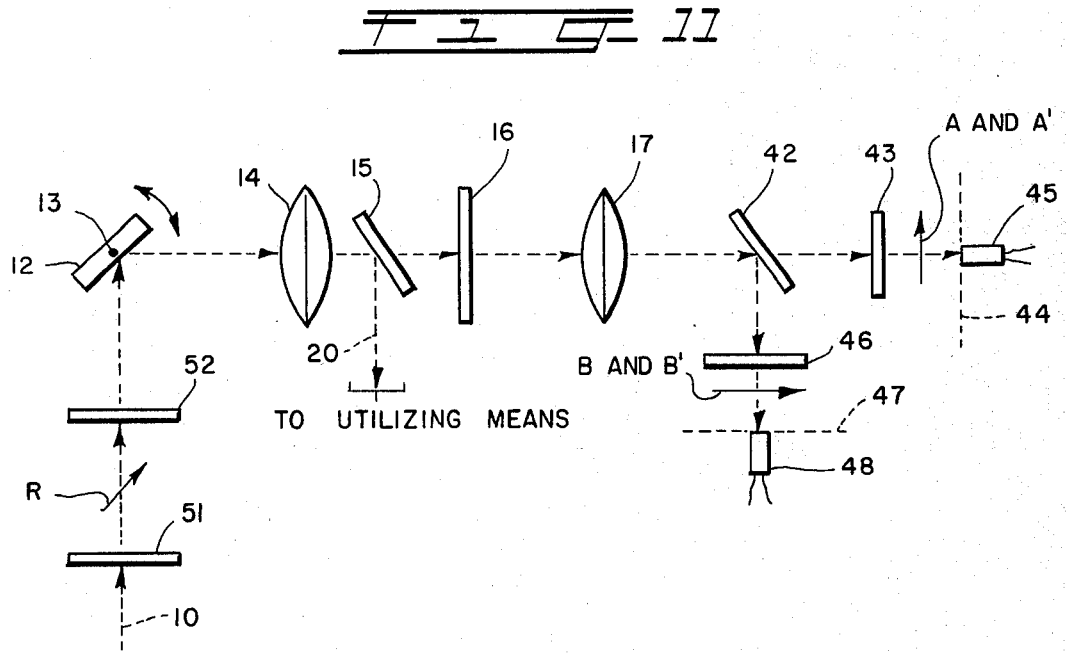
FIG. 11 is a schematic representation of yet another embodiment of apparatus according to the invention for monitoring the position of a deflected light beam.

FIG. 11 shows apparatus for an embodiment of the invention wherein another method is used to form the polarized light signals. In the apparatus of FIG. 11, polarizer 51 and aperture plate 52 replace aperture plate 11 and Wollaston prism 50 shown in FIG. 7. Aperture plate 52, as shown in more detail in FIG. 12, includes apertures 53 and 54, and quarter-wave plate 55 covering aperture 54. Quarter-wave plate 55 is characterized by having different propagation speeds for different light polarizations, more specifically, a first light component aligned with a first axis of the quarter-wave plate will be retarded $\lambda/4$ with respect to a second light component aligned with a second axis of the quarter-wave plate. It will be clear that means for retarding the second component by other than $\lambda/4$ are possible, and are also contemplated by the invention.

Figure 12:
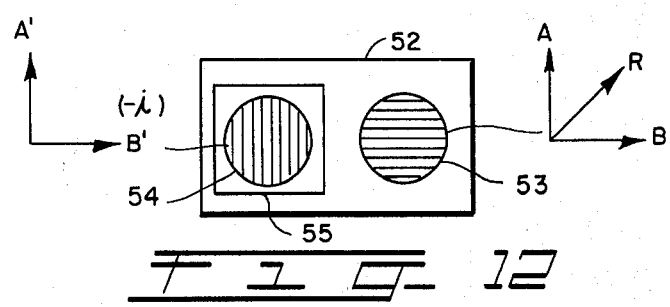
FIG. 12 illustrates an aperture plate for the apparatus of FIG. 11.

Polarizer 51 linearly polarizes light in beam 10, and quarter-wave plate 55 is oriented with respect to the polarization of beam 10 to retard one component of this polarization in the portion of beam 10 passing through aperture 54. A set of components showing one particular orientation of quarter-wave plate 55 with respect to the polarization of beam 10 is shown in FIG. 12. Beam 10 is linearly polarized as represented by vector R, which can be resolved into vertical and horizontal components A and B. This polarization passes through aperture 53 unhindered. Quarter-wave plate 55 passes component A' substantially without change, but delays component B' by a quarter wavelength. This is indicated by the imaginary number symbol $(-i)$. If components A' and B' are equal and orthogonal, light passing through quarter-wave plate 55 can be said to be circularly polarized.

If the source of beam 10 produces linearly polarized light, polarizer 51 is not needed.

Figure 13:
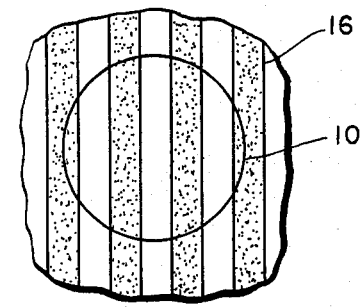
FIG. 13 is a diagram of a light pattern on a grating in the apparatus of FIG. 11.

Scanning lens 14 transforms patterned beam 10 into a Fraunhofer diffraction pattern in the plane of grating 16 that covers a number of grating lines and spaces, as shown in FIG. 13. All the information for the pattern passes through the same portion of lens 14, so aberrations in the lens are not as likely to disturb the phase relationships among different portions of the beam as in the embodiments shown in FIGS. 1 and 7. Thus, the embodiment of FIG. 11 is preferred in those applications where such phase relationships are critical.

FIG. 14 shows the principal images resolved in image plane 44 and FIG. 15 shows the principal images resolved in image plane 47. Detector 45 in image plane 44 detects the interference image caused by the coincidence of the +1 order from aperture 54 and the −1 order from aperture 53, both of which are vertically polarized and in phase; and detector 48 in image plane 47 detects the interference image caused by the coincidence of the +1 order from aperture 54 and the −1 order from aperture 53, which are both horizontally polarized, but since λ/4 plate 55 retards the horizontally polarized component of light passing through it, which are out of phase by λ/4. Thus, the light intensity signal detected by photodetector 45 can be expressed by equation (10), and the light intensity detected by photodetector 48 can be expressed by equation (16).

FIG. 16 shows another embodiment of the invention in which the apparatus of FIG. 11 has been expanded for use with a beam that can be deflected in two dimensions. For this purpose, an additional rotatable mirror 59 has been added, which is rotated around its axis 60 by a suitable actuator (not shown) in response to a deflection signal in a similar manner to the rotation of mirror 12. Also added is beam splitter 61, which splits the beam from scanning lens 14 into two portions, 10X and 10Y; portion 10X falling on grating 16X and thereafter being processed by collecting lens 17X, beam splitter 42X, polarizers 43X and 46X, and photodetectors 45X and 48X; and portion 10Y falling on grating 16Y and thereafter being processed by collecting lens 17Y, beam splitter 42Y, polarizers 43Y and 46Y, and photodetectors 45Y and 48Y.

Figure 17:
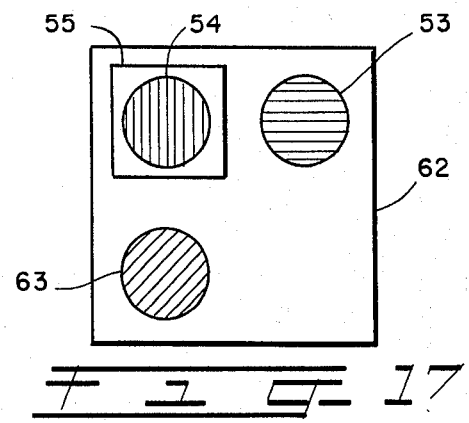
FIG. 17 illustrates an aperture plate for the apparatus of FIG. 16.

Aperture plate 62, shown in FIG. 17, is used in the apparatus of FIG. 16. Aperture plate 62 includes apertures 53 and 54 and λ/4 plate 55, and additional aperture 63 spaced the same distance from aperture 54 as aperture 53; apertures 54 and 63 being on an axis orthogonal to the axis of apertures 53 and 54.

Figure 18:
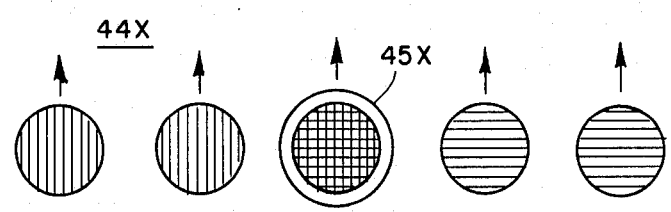
FIGS. 18, 19, 20, and 21 are diagrams of images and photodetectors in image planes in the apparatus of FIG. 17.
Figure 19:
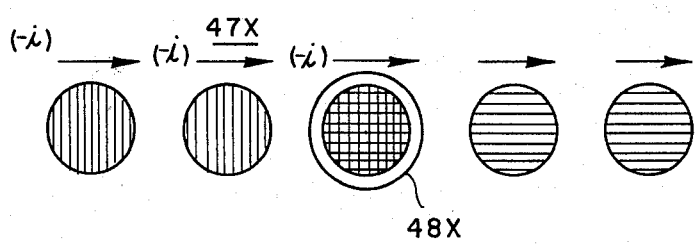
Figure 20:
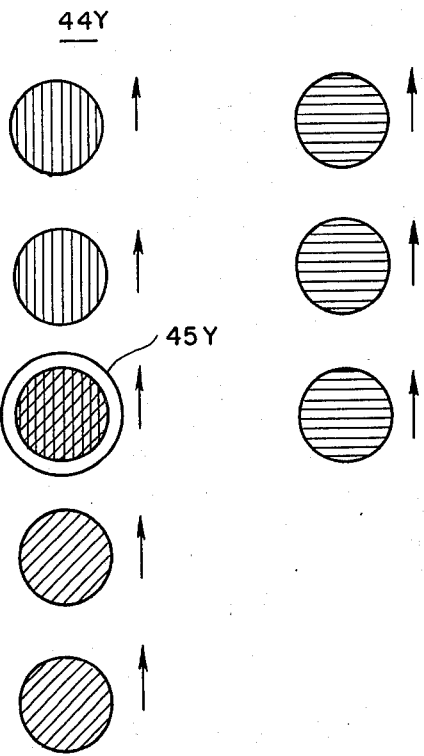
Figure 21:
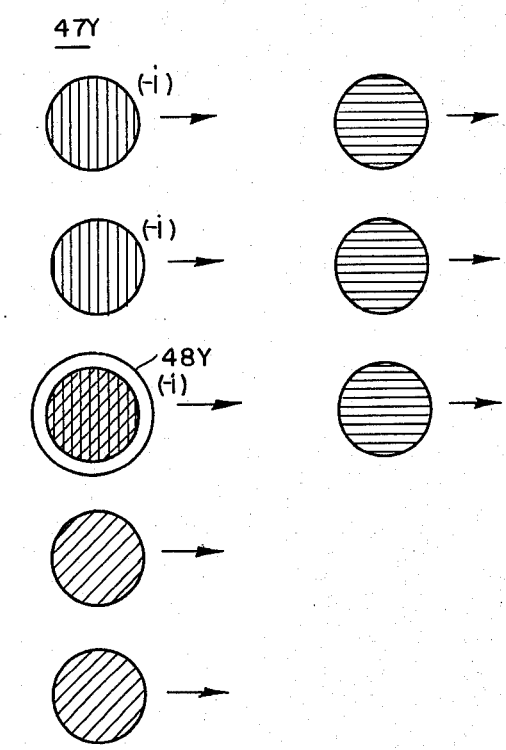

FIGS. 18 and 19 show the principal images in image planes 44X and 47X pertaining to horizontal deflection of beam 10; FIGS. 20 and 21 show the principal images in image planes 44Y and 47Y pertaining to vertical deflection of beam 10.

In FIGS. 18 and 19, the top rows of images in image planes 44X and 47X are analogous to the rows of images in image planes 44 and 47 in FIGS. 14 and 15, respectively; photodetectors 45X and 48X are positioned to detect the differently polarized versions of the interfering orders from apertures 53 and 54. The bottom row of images in each of image planes 44Y and 47Y stems from aperture 63, and are not used in image planes 44X and 47X.

In FIGS. 20 and 21, the left-hand columns of images in each of image planes 44Y and 47Y are analogous to the rows of images in image planes 44 and 47 in FIGS. 14 and 15, respectively; photodetectors 45Y and 48Y are positioned to detect the differently polarized versions of the interference images from apertures 54 and 63. If λ/4 plate 55 is oriented with respect to apertures 53 and 54 as in FIG. 12, so that the horizontal polarization is delayed by λ/4 and the vertical polarization is passed substantially without delay, the interfering orders detected by photodetector 45Y will be in phase, and the interfering orders detected by photodetector 48Y will be out of phase by λ/4, thus providing directional information for the vertical deflection of beam 10. The right-hand column of images in each of image planes 44Y and 47Y stems from aperture 53, and is not used.

Figure 22:
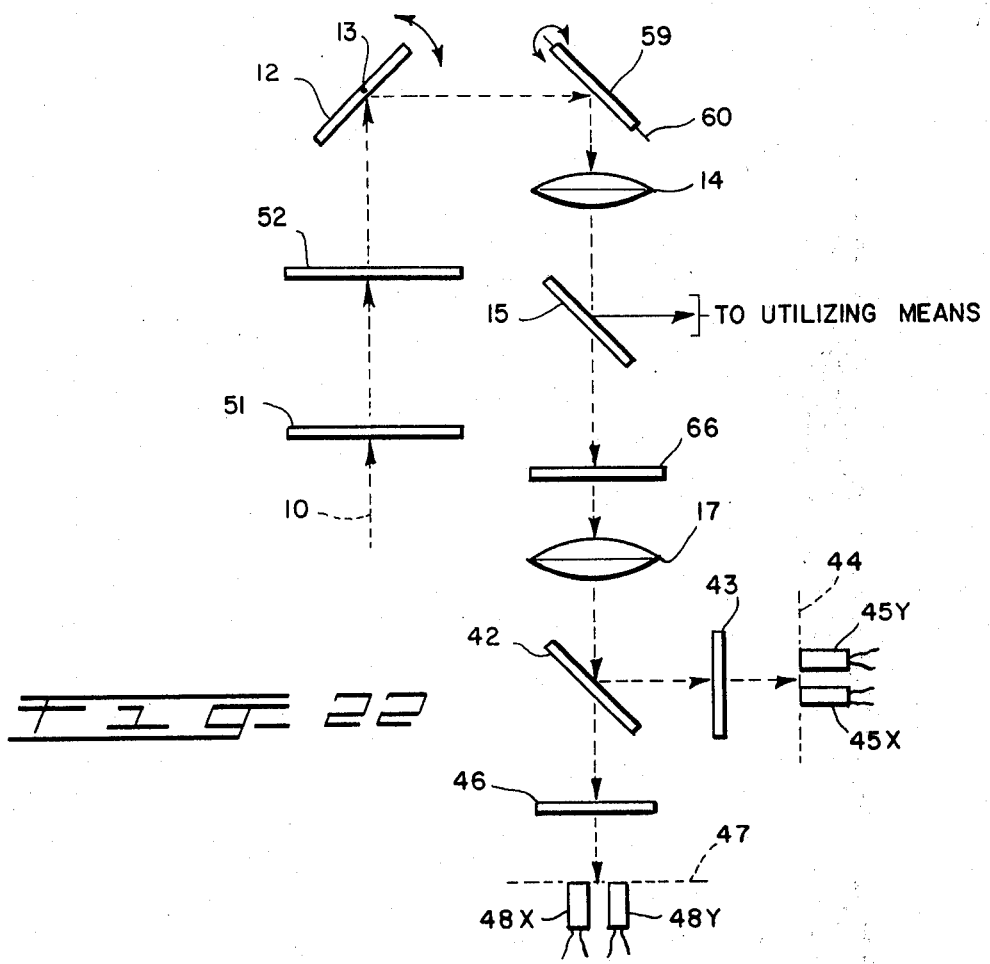
FIG. 22 is a schematic representation of apparatus according to the invention using a crossed-grid grating for monitoring the position of a light beam that is deflected in two coordinates.
Figure 23:
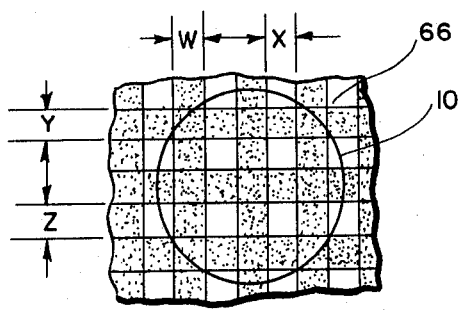
FIG. 23 is a diagram of a light pattern on a crossed-grid grating in the apparatus of FIG. 22.

FIG. 22 shows another embodiment of the invention for use with a beam that can be deflected in two dimensions, which includes a crossed-grid grating 66 in plane of gratings 16X and 16Y shown in FIG. 16, and does not require the duplication of elements shown in the apparatus of FIG. 16, e.g., collecting lenses 17X and 17Y are replaced by collecting lens 17. A portion of crossed-grid grating 66 is shown in more detail in FIG. 23. The lines in crossed-grid grating 66 are shown to intersect at right angles; however, it will be clear that other intersection angles are possible, and are also contemplated by the invention. For best results, dimensions $w$, $x$, $y$, and $z$ should be equal.

Crossed-grid grating 66 creates a more complex pattern of images in each of image planes 44 and 47 than did the simple gratings described above. The principal images in this pattern are shown for each image plane, respectively, in FIGS. 24 and 25. Five images for each aperture are shown, namely: a zero-order, +1 and −1 orders in the horizontal axis, and +1 and −1 orders in the vertical axis. For example, in FIG. 24, the five images from aperture 54 are zero-order 70; in the horizontal axis, −1 order 71 and +1 order 72 (interfering with the horizontal axis, −1 order from aperture 53); and in the vertical axis, −1 order 73 and +1 order 74 (interfering with the vertical axis, −1 order from aperture 63). Two photodetectors are placed in each image plane to sense the interference images: photodetectors 45X and 45Y in image plane 44, and photodetectors 48Y and 48X in image plane 47. The polarizations of the images are shown by arrows and horizontally polarized images stemming from aperture 54, and thus delayed by λ/4 plate 55, are identified by (−i). Again, other images that are not relevant to the invention, such as images from higher diffraction orders, and images resulting from interactions between diffraction orders from different axes, are not shown.

Figure 27:
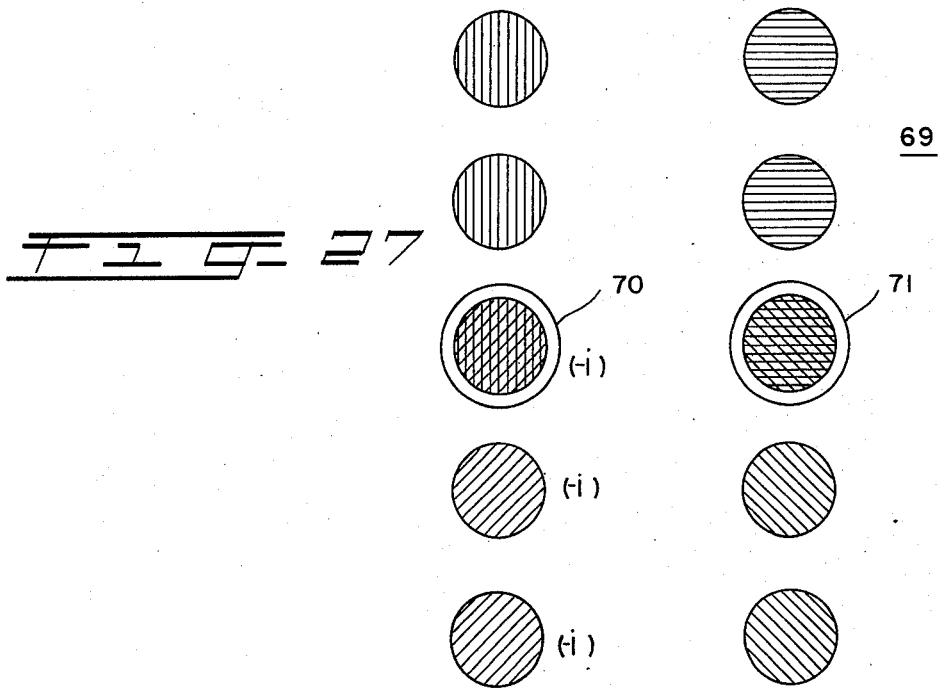
FIG. 27 is a diagram of images and photodetectors in an image plane in the apparatus of FIG. 26.

FIG. 26 shows the embodiment of the invention first shown in FIG. 1 expanded with two gratings for a beam movable in two dimensions. Note that aperture plate 27, shown in FIG. 4, is used. The image pattern in image plane 24 for horizontal deflection is identical to that shown in FIG. 5. The image pattern in image plane 69 for vertical deflection is shown in FIG. 27, which also shows the positioning of photodetectors 70 and 71. Note that orders out of phase by λ/4 interfere in the interference image sensed by photodetector 70 and in-phase orders interfere in the interference image sensed by photodetector 71 so that the light intensity signal from photodetector 71 can be expressed by equation (10) and the light intensity signal from photodetector 70 can be expressed by equation (16).

Figure 28:
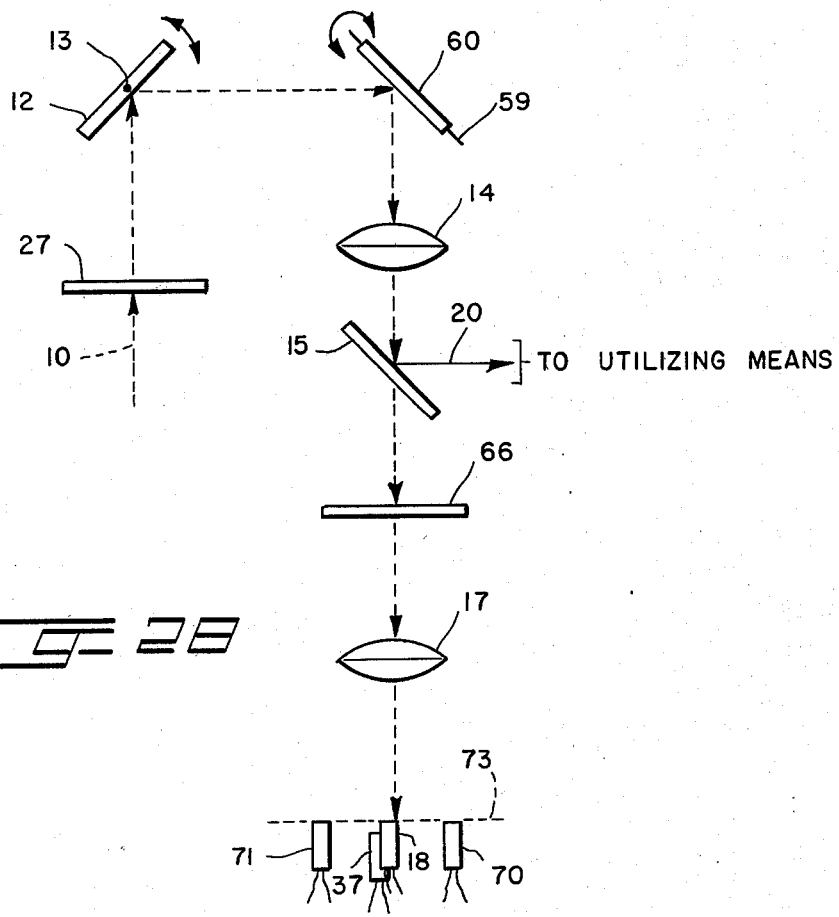
FIG. 28 is a schematic representation of another embodiment of apparatus according to the invention using a crossed-grid grating for monitoring the position of a light beam that is deflected in two coordinates.
Figure 29:
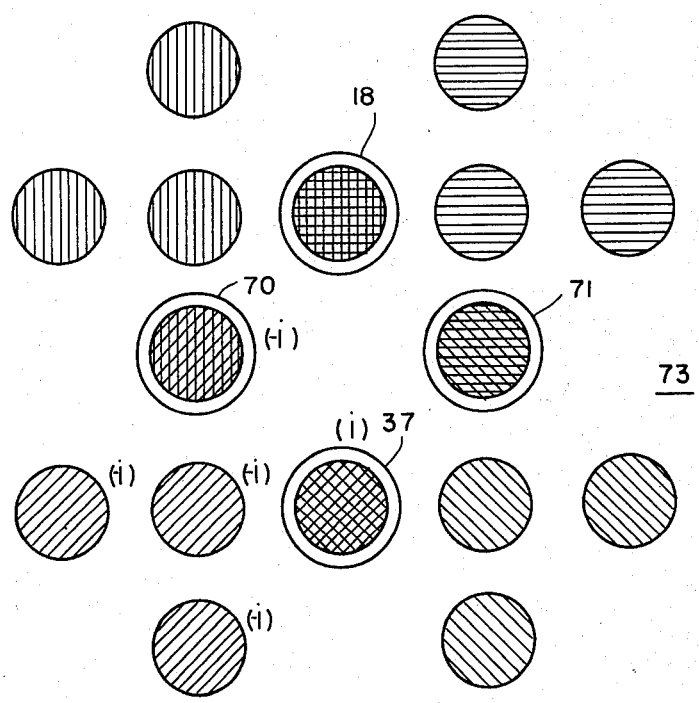
FIG. 29 is a diagram of images and photodetectors in an image plane in the apparatus of FIG. 28.

FIG. 28 shows the embodiment of the invention from FIG. 1 expanded with a crossed-grid grating for a beam movable in two dimensions. Again, aperture plate 27 is used. Note that all photodetectors shown in FIG. 26 are here grouped in single image plane 73. The image pattern in image plane 73, shown in FIG. 29 along with the placement of photodetectors 18, 37, 70, and 71 is believed to be self-explanatory in view of the previous descriptions.

Figure 30:
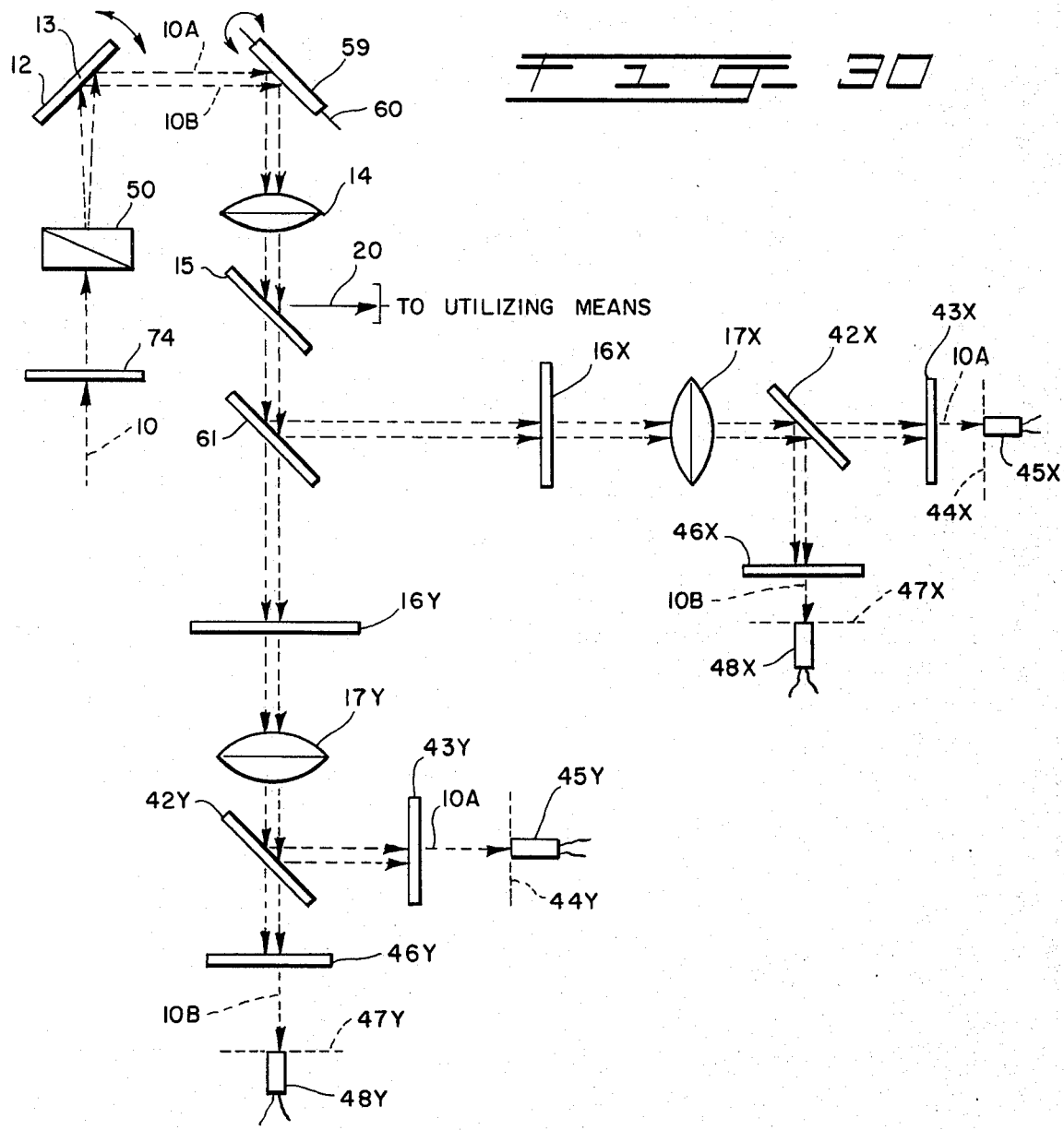
FIG. 30 is a schematic diagram of yet another embodiment of apparatus according to the invention for monitoring the position of a light beam that is deflected in two coordinates.

FIG. 30 shows the embodiment of the invention first shown in FIG. 7 expanded with two gratings for a beam movable in two dimensions. Aperture plate 74, shown in FIG. 31, is used in this embodiment. Aperture plate 74 includes three apertures 53, 54, and 63. In this embodiment, Wollaston prism 50 must be carefully adjusted so that the two beams 10A and 10B are separated on both gratings 16X and 16Y by the proper amount to cause the pair of signals from photodetectors 45X and 48X and the pair of signals from photodetectors 45Y and 48Y each to be out of phase by 90° as beam 10 is deflected across the gratings.

FIG. 32 shows the pattern and the positioning of photodetector 45X in image plane 44X for the embodiment of FIG. 30. FIG. 33 shows the pattern and the positioning of photodetector 45Y in image plane 44X. All elements in image planes 44X and 44Y are vertically polarized. The images and photodetector positions in image planes 47X and 47Y are analogous to those in image planes 44X and 44Y, respectively, so these are not shown. The intensity variations of the images in planes 47X and 47Y will be out of phase with those in planes 44X and 44Y as beams 10A and 10B are moved across gratings 16X and 16Y because of the difference in positions of beams 10A and 10B in the planes of the gratings.

Figure 34:
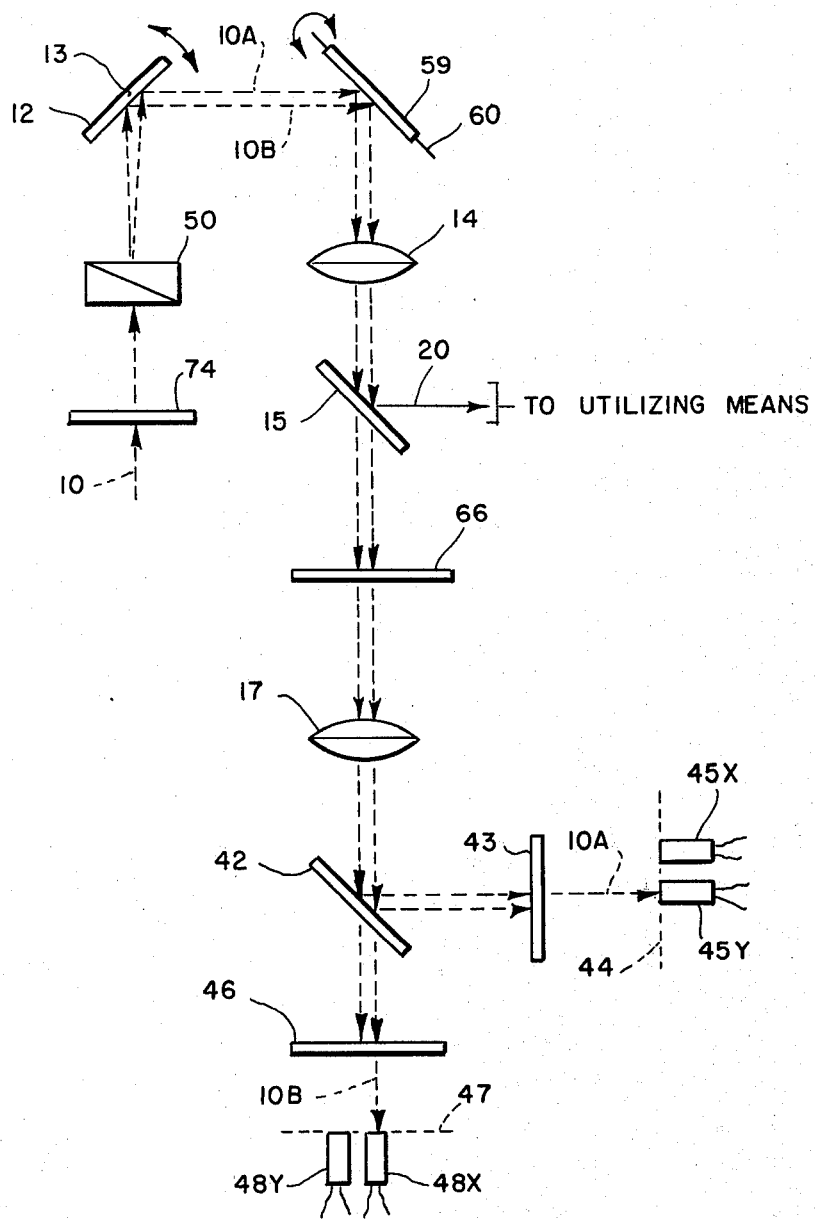
FIG. 34 is a schematic representation of yet another embodiment of apparatus according to the invention using a crossed-grid grating for monitoring the position of a light beam that is deflected in two coordinates.
Figure 35:
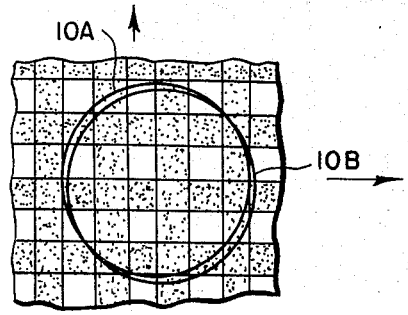
FIG. 35 is a diagram of light patterns on a grating in the apparatus of FIG. 34.
Figure 36:
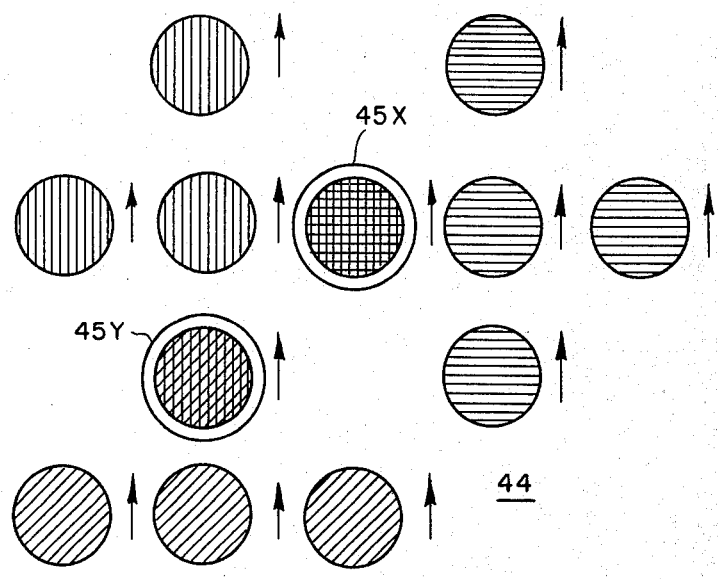
FIG. 36 is a diagram of images and photodetectors in an image plane in the apparatus of FIG. 34.

FIG. 34 shows the embodiment of the invention from FIG. 7 expanded with a crossed-grid grating 66 for a beam movable in two dimensions. Again, aperture plate 74 is used in the apparatus of FIG. 34. Wollaston prism 50 must be adjusted to position the Fraunhofer diffraction patterns of beams 10A and 10B in the plane of crossed-grid grating 66 so that the proper phase relationships result between the signals from photodetectors 45X and 48X and the signals from photodetectors 45Y and 48Y. The positioning of these patterns is shown in FIG. 35. Note in this figure that the diffraction pattern for beam 10B is offset the same distance downward as it is to the right with respect to the diffraction pattern for beam 10A. FIG. 36 shows the vertically polarized pattern and the positioning of the photodetectors in image plane 44. The horizontally polarized pattern and photodetector positions (not shown) in image plane 47 are identical to those in image plane 44.

Figure 37:
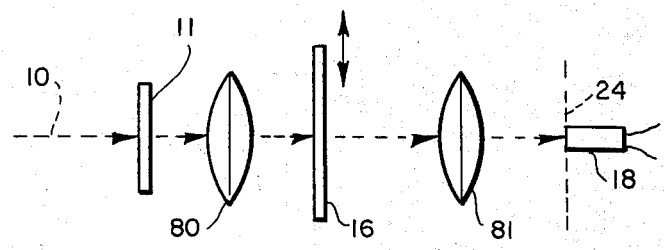
FIG. 37 is an embodiment of apparatus according to the invention for monitoring the position of a moving grating with respect to a stationary light beam.

FIG. 37 shows an embodiment of the invention for use in apparatus having a stationary light beam and a moving grating. Coherent light beam 10 passes through aperture plate 11, lens 80, grating 16, and collecting lens 81, and impinges on photodetector 18. Grating 16 is movable, for example, grating 16 could be attached to a movable portion of a numerically controlled machine tool. Lenses 80 and 81 perform similar functions to those of lenses 14 and 17, respectively, in the embodiments described above in that lens 80 transforms beam 10, as patterned by aperture plate 11, into a Fraunhofer diffraction pattern in the plane of grating 16, and lens 81 collects light passing through grating 16 to form an image in image plane 24. However, since beam 10 is not deflected with respect to the lenses, these need not be as large as in the previously described embodiments, hence, the requirements on their design are less severe.

Using aperture plate 11, as shown in FIG. 2, in the apparatus of FIG. 37 the image pattern of FIG. 3 will appear in image plane 24, and a signal having twice the periodicity of grating 16 will be generated by photodetector 18 when grating 16 is moved. It will be clear to those skilled in the art how the other embodiments of the invention described above could be adapted for use with a fixed light beam and a movable grating.

Clearly, other embodiments of the invention are possible for monitoring other methods of producing relative movement between a coherent light beam and a grating.

One skilled in the art may make changes and modifications to the embodiments of the invention disclosed herein, and may devise other embodiments, without departing from the spirit and scope of the invention.

What is claimed is:
1. In a method of monitoring relative movement between an incident beam of substantially coherent light and a grating on which the beam is directed, wherein light from the beam passing through the grating is detected by a photodetector and the cycles in the photodetector output signal are counted, the improvement which comprises:
  a. patterning the incident beam into a plurality of elements;
  b. transforming the patterned beam into a Fraunhofer diffraction pattern in the plane of the grating, the grating diffracting the transformed beam into diffraction orders;
  c. resolving the diffraction orders in an image plane;
  d. spacing the elements in step (a) to cause the +1 diffraction order from one of the elements to coincide with the −1 diffraction order from another of the elements to form an interference image in the image plane; and
  e. positioning the photodetector in the image plane to detect the interference image.

2. The method of claim 1 wherein light from the beam passing through the grating is detected with two photodetectors and the direction of relative movement between the beam and the grating is determined from the phase difference between the output signals from the two photodetectors, and wherein step (d) comprises spacing the elements to form first and second interference images in the image plane and step (e) comprises positioning each of the two photodetectors to detect a different one of the interference images.

3. The method of claim 2 which further comprises:
  f. retarding the light in one of the elements, one of the interference images comprising one of the diffraction orders from the retarded element.

4. The method of claim 3 wherein step (f) comprises retarding the light by substantially λ/4 where λ is the wavelength of the light.

5. The method of claim 2 which further comprises:
  f. linearly polarizing the incident beam to have a first component oriented in a first direction and a second component oriented in a second direction;
  g. retarding the light in the second component of at least one of the elements; and
  h. separating the first components of the diffraction orders from the second components of the diffraction orders;
  wherein step (c) comprises resolving the first components of the diffraction orders in a first image plane and the second components of the diffraction orders in a second image plane; and
  step (d) comprises spacing the elements in step (a) to cause the first component of the +1 diffraction order from one of the elements to coincide with the first component of the −1 diffraction order from another of the elements to form the first interference image in the first image plane, and the second component of the +1 diffraction order from one of the elements to coincide with the second component of the −1 diffraction order from another of the elements to form the second interference image in the second image plane, one of the second diffraction orders in the second interference image being from one of the elements in which the second component is retarded.

6. The method of claim 5 wherein step (g) comprises retarding the light in the second component by substantially $\lambda/4$ where $\lambda$ is the wavelength of the light.

7. In a method of monitoring relative movement between an incident beam of substantially coherent light and a grating on which the beam is directed, wherein the incident beam is divided into a first subsidiary beam polarized in a first direction and a second subsidiary beam polarized in a second direction, the first and second subsidiary beams diverging at an angle, and wherein light from each subsidiary beam passing through the grating is separated and sensed with a photodetector, the cycles in the output signal from one of the photodetectors are counted, and the phase angle between the output signals of the photodetectors is used to determine the direction of relative movement, the improvement which comprises:
   a. patterning the incident beam into a plurality of elements;
   b. transforming each of the subsidiary beams into a Fraunhofer diffraction pattern in the plane of the grating, the grating diffracting the transformed beams into diffraction orders;
   c. resolving the diffraction orders of the first subsidiary beam in a first image plane and the diffraction orders of the second subsidiary beam in a second image plane;
   d. spacing the elements in step (a) to cause the +1 diffraction order of the first subsidiary beam from one of the elements to coincide with the −1 diffraction order of the first subsidiary beam from another of the elements to form a first interference image in the first image plane and the +1 diffraction order of the second subsidiary beam from one of the elements to coincide with the −1 diffraction order of the second subsidiary beam from another of the elements to form a second interference image in the second image plane; and
   e. positioning each of the two photodetectors to sense a different one of the interference images.

8. In a method of monitoring two-dimensional movement of a beam of substantially coherent light wherein the beam is split into two portions, one of the portions is directed onto a first grating having lines periodically disposed parallel to a first axis and the other portion is directed onto a second grating having lines periodically disposed parallel to a second axis, and wherein light passing through each grating is sensed by a photodetector associated with that grating and the position of the beam is tracked by counting cycles in the output signals of the photodetectors, the improvement which comprises:
   a. patterning the incident beam into at least three elements;
   b. transforming the patterned beam into a Fraunhofer diffraction pattern in the plane of each grating, the gratings diffracting the transformed elements into diffraction orders;
   c. resolving the diffraction orders from the first grating in a first image plane and the diffraction orders from the second grating in a second image plane;
   d. spacing the elements in step (a) to cause the +1 diffraction order from one of the elements to coincide with the −1 diffraction order from another of the elements to form a first interference image in the first image plane, and the +1 diffraction order from one of the elements to coincide with the −1 diffraction order from another of the elements to form a second interference image in the second image plane; and
   e. positioning each of the two photodetectors to sense a different one of the interference images.

9. In a method of monitoring two-dimensional movement between an incident beam of substantially coherent light and two gratings on which portions of the beam are directed, wherein light from the beam passing through each grating is detected by a photodetector and the cycles in the output signal from each photodetector are counted to monitor the position of the beam, the improvement which comprises:
   a. combining the two gratings into a single, crossed-grid grating having a first set of grating lines parallel to a first axis and a second set of grating lines parallel to a second axis;
   b. patterning the incident beam into at least three elements;
   c. transforming the patterned beam into a Fraunhofer diffraction pattern in the plane of the crossed-grid grating, the first grating lines diffracting the transformed beam into first diffraction orders and the second grating lines diffracting the transformed beam into second diffraction orders;
   d. resolving the diffracted orders in an image plane;
   e. spacing the elements in step (b) to cause the +1 first diffraction order from one of the elements to coincide with the −1 first diffraction order of another of the elements to form a first interference image in the image plane and the +1 second diffraction order from one of the elements to coincide with the −1 second diffraction order from another of the elements to form a second interference image in the image plane; and
   f. positioning the photodetectors in the image plane to detect the interference images, each two cycles in the output signals of one of the photodetectors corresponding to a relative movement of the transformed beam through one grating period in the direction associated with that photodetector.

10. The method of claim 9 wherein step (a) further comprises aligning the first lines to be substantially perpendicular to the second lines.

11. The method of claim 9 wherein light from the beam is detected by two photodetectors for each set of grating lines and the direction of movement of the beam perpendicular to the axis associated with each set of grating lines is determined from the phase angle between the output signals from the two photodetectors associated with those grating lines; wherein step (b) comprises:
   patterning the incident beam into at least three elements, an additional step comprises:
   g. retarding the light in at least one of the elements; step (e) comprises:
   spacing the elements in step (a) to cause additional third and fourth interference images in the image plane, the third interference image comprising a +1 first diffraction order from one of the elements coinciding with a −1 first diffraction order from another of the elements, and the fourth interference image comprising a +1 second diffraction order from one of the elements coinciding with a −1 second diffraction order from another of the elements, one of the diffraction orders in each of the third and fourth interference images being from one of the elements in which light is retarded; and step (f) further comprises:

positioning the two photodetectors for the first set of grating lines to detect the first and third interference images and the two photodetectors for the second set of grating lines to detect the second and fourth interference images.

12. The method of claim 9 wherein light from the beam is detected by two photodetectors for each set of grating lines and the direction of movement of the beam perpendicular to the axis associated with each set of grating lines is determined from the phase angle between the output signals from the two photodetectors associated with those grating lines, wherein an additional step comprises:

g. linearly polarizing the incident beam to have a first component oriented in a first direction and a second component oriented in a second direction; step (b) comprises:

patterning the incident beam into at least three elements; further additional steps comprise:

h. retarding the light in the second component of at least one of the elements;

i. separating the first components of the diffraction orders from the second components of the diffraction orders; step (d) further comprises:

resolving the first components of the diffraction orders in a first image plane and the second components of the diffraction orders in a second image plane; step (e) further comprises:

spacing the elements in step (b) to cause:

i. the first component of the +1 first diffraction order of one of the elements to coincide with the first component of the −1 first diffraction order of another of the elements to form a first interference image in the first image plane;

ii. the first component of the +1 second diffraction order of one of the elements to coincide with the first component of the −1 second diffraction order of another of the elements to form a second interference image in the first image plane;

iii. the second component of the +1 first diffraction order of one of the elements to coincide with the second component of the −1 first diffraction order of another of the elements to form a third interference image in the second image plane;

iv. the second component of the +1 second diffraction order of one of the elements to coincide with the second component of the −1 second diffraction order of another of the elements to form a fourth interference image in the second image plane, one of the second diffraction orders in each of the third and fourth interference images being from one of the elements in which the second component of light is retarded, and step (f) further comprises:

positioning the photodetectors for the first set of grating lines to detect the first interference image and the third interference image, respectively, and the photodetectors for the second set of grating lines to detect the second interference image and the fourth interference image, respectively.

13. In a method of monitoring two-dimensional movement between an incident beam of substantially coherent light and first and second gratings on which the beam is directed wherein the incident beam is divided into a first subsidiary beam polarized in a first direction and a second subsidiary beam polarized in a second direction, the first and second subsidiary beams diverging at an angle, and wherein light from each subsidiary beam passing through each grating is separated and sensed with a photodetector, for each grating the cycles in the output signal from one of the photodetectors for that grating are counted to track the position of the beam with respect to that grating, and the phase angle between the output signals of both the photodetectors for that grating is used to determine the direction of movement of the beam with respect to that grating, the improvement which comprises:

a. patterning the incident beam into at least three elements;

b. transforming each of the subsidiary beams into a Fraunhofer diffraction pattern in the plane of each grating, the gratings diffracting the transformed beams into diffraction orders;

c. for the first grating, resolving the diffraction orders of the first subsidiary beam in a first image plane and the diffraction orders from the second subsidiary beam in a second image plane;

d. for the second grating, resolving the diffraction orders of the first subsidiary beam in a third image plane and the diffraction orders from the second subsidiary beam in a fourth image plane;

e. spacing the elements in step (a) to cause:

i. the +1 diffraction order of the first subsidiary beam from one of the elements to coincide with the −1 diffraction order of the first subsidiary beam from another of the elements to form a first interference image in the first image plane, ii. the +1 diffraction order of the second subsidiary beam from one of the elements to coincide with the −1 diffraction order of the second subsidiary beam to form a second interference image in the second image plane, iii. the +1 diffraction order of the first subsidiary beam from one of the elements to coincide with the −1 diffraction order of the first subsidiary beam from another of the elements to form a third interference image in the third image plane, and iv. the +1 diffraction order of the second subsidiary beam from one of the elements to coincide with the −1 diffraction order of the second subsidiary beam from another of the elements to form a fourth interference image in the fourth image plane; and f. positioning the two photodetectors for the first grating to detect the first and second interference images, respectively, and the two photodetectors for the second grating to detect the third and fourth interference images, respectively.

14. In a method of monitoring two-dimensional movement between an incident beam of substantially coherent light and two gratings on which portions of the beam are directed, wherein the incident beam is divided into a first subsidiary beam polarized in a first direction and a second subsidiary beam polarized in a second direction, the first and second subsidiary beams diverging at an angle, and wherein light from each subsidiary beam passing through each grating is separated and sensed with a photodetector, for each grating the cycles in the output signal from one of the photodetectors for that grating are counted to track the position of the beam with respect to that grating and the phase angle between the output signals of both the photodetectors for that grating is used to determine the direction of movement of the beam with respect to that grating, the improvement which comprises:

a. combining the two gratings into a single, crossed-grid grating having a first set of grating lines parallel to a first axis and a second set of grating lines parallel to a second axis;

b. patterning the incident beam into at least three elements;

c. transforming each of the subsidiary beams into a Fraunhofer diffraction pattern in the plane of the crossed-grid grating, the first lines diffracting the transformed beams into first diffraction orders and the second lines diffractng the transformed beams into second diffraction orders;

d. resolving the first and second diffraction orders of the first subsidiary beam in a first image plane and the first and second diffraction orders of the second subsidiary beam in a second image plane;

e. spacing the elements in step (b) to cause:
  i. the +1 first diffraction order of the first subsidiary beam from one of the elements to coincide with the −1 first diffraction order of the first subsidiary beam from another of the elements to form a first interference image in the first image plane,
  ii. the +1 first diffraction order of the second subsidiary beam from one of the elements to coincide with the −1 first diffraction order of the second subsidiary beam from another of the elements to form a second interference image in the second image plane,
  iii. the +1 second diffraction order of the first subsidiary beam from one of the elements to coincide with the −1 second diffraction order of the first subsidiary beam from another of the elements to form a third interference image in the first image plane, and
  iv. the +1 second diffraction order of the second subsidiary beam from one of the elements to coincide with the −1 second diffraction order of the second subsidiary beam from another of the elements to form a fourth interference image in the second image plane; and f. positioning the two photodetectors for the first grating to detect the first and second interference patterns, respectively, and the two photodetectors for the second grating to detect the third and fourth interference patterns, respectively.

15. In apparatus for monitoring relative movement between an incident beam of substantially coherent light and a grating on which the beam is directed, wherein light from the beam passing through the grating is detected by a photodetector and the cycles in the photodetector output signal are counted, the improvement which comprises:

a. an aperture plate in the path of the incident beam for patterning the incident beam into a plurality of elements;

b. means for transforming the patterned beam into a Fraunhofer diffraction pattern in the plane of the grating, the grating serving to diffract the transformed beam into diffraction orders; and c. means for resolving the diffraction orders in an image plane;

d. wherein the apertures in the aperture plate are spaced to cause the +1 diffraction order from one of the elements to coincide with the −1 diffraction order from another of the elements to form an interference image in the image plane; and e. the photodetector is positioned in the image plane to detect the interference image.

16. The improved apparatus of claim 15 wherein light from the beam passing through the grating is detected with two photodetectors and the direction of relative movement between the beam and the grating is determined from the phase difference between the output signals from the two photodetectors, and wherein the apertures in the aperture plate are spaced to form first and second interference images in the image plane and each of the two photodetectors is positioned to detect one of the interference images.

17. The improved apparatus of claim 16 which further comprises:

f. means for retarding the light in one of the elements, one of the interference images comprising one of the diffraction orders from the retarded element.

18. The improved apparatus of claim 17 wherein the retarding means comprises a $\lambda/4$ phase plate positioned over one of the apertures where $\lambda$ is the wavelength of the light.

19. The improved apparatus of claim 16 which further comprises:

f. a polarizer for linearly polarizing the incident beam to have a first component oriented in a first direction and a second component oriented in a second direction;

g. means for retarding the light in the second component of at least one of the elements; and h. means for separating the first components of the diffraction orders from the second components of the diffraction orders;

wherein the resolving means resolves the first components of the diffraction orders in a first image plane and the second components of the diffraction orders in a second image plane; and the apertures in the aperture plate are spaced to cause the first component of the +1 diffraction order from one of the elements to coincide with the first component of the −1 diffraction order from another of the elements to form the first interference image in the first image plane, and the second component of the +1 diffraction order from one of the elements to coincide with the second component of the −1 diffraction order from another of the elements to form the second interference image in the second image plane, one of the second diffraction orders in the second interference image being from one of the elements in which the second component is retarded.

20. The improved apparatus of claim 19 wherein the retarding means comprises a quarter-wave plate positioned over one of the apertures and oriented to retard the light in the second component by substantially $\lambda/4$ where $\lambda$ is the wavelength of the light.

21. In apparatus for monitoring relative movement between an incident beam of substantially coherent light and a grating on which the beam is directed, wherein the incident beam is divided into a first subsidiary beam polarized in a first direction and a second subsidiary beam polarized in a second direction, the first and second subsidiary beams diverging at an angle, and wherein light from each subsidiary beam passing through the grating is separated and sensed with a photodetector, the cycles in the output signal from one of the photodetectors are counted, and the phase angle between the output signals of the photodetectors is used to determine the direction of relative movement, the improvement which comprises:

a. an aperture plate in the path of the incident beam for patterning the incident beam into a plurality of elements;

b. means for transforming each of the subsidiary beams into a Fraunhofer diffraction pattern in the plane of the grating, the grating serving to diffract the transformed beams into diffraction orders; and c. means for resolving the diffraction orders of the first subsidiary beam in a first image plane and the diffraction orders of the second subsidiary beam in a second image plane;

d. wherein the apertures in the aperture plate are spaced to cause the +1 diffraction order of the first subsidiary beam from one of the elements to coincide with the −1 diffraction order of the first subsidiary beam from another of the elements to form a first interference image in the first image plane and the +1 diffraction order of the second subsidiary beam from one of the elements to coincide with the −1 diffraction order of the second subsidiary beam from another of the elements to form a second interference image in the second image plane; and e. each of the two photodetectors is positioned to sense one of the interference images.

22. In apparatus for monitoring two-dimensional movement of a beam of substantially coherent light wherein the beam is split into two portions, one of the portions is directed onto a first grating having lines periodically disposed parallel to a first axis and the other portion is directed onto a second grating having lines periodically disposed parallel to a second axis, and wherein light passing through each grating is sensed by a photodetector associated with that grating and the position of the beam is tracked by counting cycles in the output signals of the photodetectors, the improvement which comprises:

a. an aperture plate in the path of the incident beam for patterning the incident beam into at least three elements;

b. means for transforming the patterned beam into a Fraunhofer diffraction pattern in the plane of each grating, the gratings serving to diffract the transformed elements into diffraction orders; and c. means for resolving the diffraction orders from the first grating in a first image plane and the diffraction orders from the second grating in a second image plane;

d. wherein the apertures in the aperture plate are spaced to cause the +1 diffraction order from one of the elements to coincide with −1 diffraction order of another of the elements to form a first interference image in the first image plane and the +1 diffraction order of one of the elements to coincide with the −1 diffraction order of another of the elements to form a second interference image in the second image plane; and e. each of the two photodetectors is positioned to sense the interference images.

23. In apparatus for monitoring two-dimensional movement between an incident beam of substantially coherent light and two gratings on which the beam is directed, wherein light from the beam passing through each grating is detected by a photodetector and the cycles in the output signal from each photodetector are counted to monitor the position of the beam, the improvement wherein:

a. the two gratings are combined into a single, crossed-grid grating having a first set of grating lines parallel to a first axis and a second set of grating lines parallel to a second axis; and which further comprises:

b. an aperture plate in the path of the incident beam for patterning the incident beam into at least three elements;

c. means for transforming the patterned beam into a Fraunhofer diffraction pattern in the plane of the crossed-grid grating, the first grating lines serving to diffract the transformed beam into first diffraction orders and the second lines serving to diffract the transformed beam into second diffraction orders; and d. means for resolving the diffracted orders in an image plane;

e. wherein the apertures in the aperture plate are spaced to cause the +1 first diffraction order from one of the elements to coincide with the −1 first diffraction order of another of the elements to form a first interference image in the image plane and the +1 second diffraction order from one of the elements to coincide with the −1 second diffraction order from another of the elements to form a second interference image in the image plane; and f. the photodetectors in the image plane are positioned to detect the interference images;

g. whereby each two cycles in the output signals of one of the photodetectors correspond to a relative movement of the transformed beam past one grating period in the direction associated with that photodetector.

24. The improved apparatus of claim 23 wherein, in the crossed-grid grating, the first lines are substantially perpendicular to the second lines.

25. The improved apparatus of claim 23 wherein light from the beam is detected by two photodetectors for each set of grating lines and the direction of movement of the beam perpendicular to the axis associated with each set of grating lines is determined from the phase angle between the output signals from the two photodetectors associated with those grating lines; wherein the aperture plate comprises at least three apertures spaced to cause additional third and fourth interference images in the image plane, the third interference image comprising a +1 first diffraction order from one of the elements coinciding with a −1 first diffraction order from another of the elements, and the fourth interference image comprising a +1 second diffraction order from one of the elements coinciding with a −1 second diffraction order from another of the elements; which further comprises:

g. means for retarding the light in at least one of the elements;

h. wherein one of the diffraction orders in each of the third and fourth interference images is from one of the elements in which light is retarded; and i. the two photodetectors for the first set of grating lines are positioned to detect the first and third interference images and the two photodetectors for the second set of grating lines are positioned to detect the second and fourth interference images.

26. The improved apparatus of claim 23 wherein light from the beam is detected by two photodetectors for each set of grating lines and the direction of movement of the beam perpendicular to the axis associated with each set of grating lines is determined from the phase angle between the output signals from the two photodetectors associated with those grating lines, wherein the aperture plate comprises at least three apertures and which further comprises:
   g. a polarizer for linearly polarizing the incident beam to have a first component oriented in a first direction and a second component oriented in a second direction; step (b) comprises:
   h. means for retarding the light in the second component of at least one of the elements;
   i. means for separating the first components of the diffraction orders from the second components of the diffraction orders; wherein
   j. the resolving means resolves the first components of the diffraction orders in a first image plane and the second components of the diffraction orders in a second image plane;
   k. the apertures in the aperture plate are spaced to cause:
      i. the first component of the +1 first diffraction order of one of the elements to coincide with the first component of the −1 first diffraction order of another of the elements to form a first interference image in the first image plane;
      ii. the first component of the +1 second diffraction order of one of the elements to coincide with the first component of the −1 second diffraction order of another of the elements to form a second interference image in the first image plane;
      iii. the second component of the +1 first diffraction order of one of the elements to coincide with the second component of the −1 first diffraction order of another of the elements to form a third interference image in the second image plane;
      iv. the second component of the +1 second diffraction order of one of the elements to coincide with the second component of the −1 second diffraction order of another of the elements to form a fourth interference image in the second image plane, one of the second diffraction orders in each of the third and fourth interference images being from one of the elements in which the second component of light is retarded; and
   l. the photodetectors for the first set of grating lines are positioned to detect the first interference image and the third interference image, respectively, and the photodetectors for the second set of grating lines to detect the second interference image and the fourth interference image, respectively.

27. In apparatus for monitoring two-dimensional movement between an incident beam of substantially coherent light and first and second gratings on which the beam is directed wherein the incident beam is divided into a first subsidiary beam polarized in a first direction and a second subsidiary beam polarized in a second direction, the first and second subsidiary beams diverging at an angle, and wherein light from each subsidiary beam passing through each grating is separated and sensed with a photodetector, for each grating the cycles in the output signal from one of the photodetectors for that grating are counted to track the position of the beam with respect to that grating, and the phase angle between the output signals of both the photodetectors for that grating is used to determine the direction of movement of the beam with respect to that grating, the improvement which comprises:
   a. an aperture plate in the path of the beam for patterning the incident beam into at least three elements;
   b. means for transforming each of the subsidiary beams into a Fraunhofer diffraction pattern in the plane of each grating, the gratings serving to diffract the transformed beams into diffraction orders;
   c. for the first grating, means for resolving the diffraction orders of the first subsidiary beam in a first image plane and the diffraction orders from the second subsidiary beam in a second image plane; and
   d. for the second grating, means for resolving the diffraction orders of the first subsidiary beam in a third image plane and the diffraction orders from the second subsidiary beam in a fourth image plane;
   e. wherein the apertures in the aperture plate are spaced to cause:
      i. the +1 diffraction order of the first subsidiary beam from one of the elements to coincide with the −1 diffraction order of the first subsidiary beam from another of the elements to form a first interference image in the first image plane,
      ii. the +1 diffraction order of the second subsidiary beam from one of the elements to coincide with the −1 diffraction order of the second subsidiary beam to form a second interference image, in the second image plane,
      iii. the +1 diffraction order of the first subsidiary beam from one of the elements to coincide with the −1 diffraction order of the first subsidiary beam from another of the elements to form a third interference image in the third image plane, and
      iv. the +1 diffraction order of the second subsidiary beam from one of the elements to coincide with the −1 diffraction order of the second subsidiary beam from another of the elements to form a fourth interference image in the fourth image plane; and
   f. the two photodetectors for the first grating are positioned to detect the first and second interference patterns, respectively, and the two photodetectors for the second grating are positioned to detect the third and fourth interference patterns.

28. In apparatus for monitoring two-dimensional movement between an incident beam of substantially coherent light and two gratings on which portions of the beam are directed, wherein the incident beam is divided into a first subsidiary beam polarized in a first direction and a second subsidiary beam polarized in a second direction, the first and second subsidiary beams diverging at an angle, and wherein light from each subsidiary beam passing through each grating is separated and sensed with a photodetector, for each grating the cycles in the output signal from one of the photodetectors for the grating are counted to track the position of the beam with respect to that grating and the phase angle between the output signals of both the photodetectors for that grating is used to determine the direction of movement of the beam with respect to that grating, the improvement wherein:
  a. the two gratings are combined into a single, crossed-grid grating having a first set of grating lines parallel to a first axis and a second set of grating lines parallel to a second axis; and which further comprises:
  b. an aperture plate in the path of the incident beam for patterning the incident beam into at least three elements;
  c. means for transforming each of the subsidiary beams into a Fraunhofer diffraction pattern in the plane of the crossed-grid grating, and the first grating lines serving to diffract the transformed beams into first diffraction orders and the second grating lines serving to diffract the transformed beams into second diffraction orders; and
  d. means for resolving the first and second diffraction orders of the first subsidiary beam in a first image plane and the first and second diffraction orders of the second subsidiary beam in a second image plane;
  e. wherein the apertures in the aperture plate are spaced to cause:
    i. the +1 first diffraction order of the first subsidiary beam from one of the elements to coincide with the −1 first diffraction order of the first subsidiary beam from another of the elements to form a first interference image in the first image plane,
    ii. the +1 first diffraction order of the second subsidiary beam from one of the elements to coincide with the −1 first diffraction order of the second subsidiary beam from another of the elements to form a second interference image in the second image plane,
    iii. the +1 second diffraction order of the first subsidiary beam from one of the elements to coincide with the −1 second diffraction order of the first subsidiary beam from another of the elements to form a third interference image in the first image plane, and
    iv. the +1 second diffraction order of the second subsidiary beam from one of the elements to coincide with the −1 second diffraction order of the second subsidiary beam from another of the elements to form a fourth interference image in the second image plane; and
  f. the two photodetectors for the first grating are positioned to detect the first and second interference patterns, respectively, and the two photodetectors for the second grating are positioned to detect the third and fourth interference patterns, respectively.

* * * * *

UNITED STATES PATENT OFFICE
CERTIFICATE OF CORRECTION

Patent No. 3,996,463     Dated December 7, 1976

Inventor(s) D. P. Jablonowski

It is certified that error appears in the above-identified patent and that said Letters Patent are hereby corrected as shown below:

In the specification, Column 2, line 53, "FIG. 9 and 10" should read --FIGS. 9 and 10--. Column 5, line 27, "1" should read --+1--; line 38, equation (2), that portion of the equation reading "= - 2 $\lambda$ bx" should read -- = - 2 $\pi$ bx--; line 41, equation (3), that portion of the equation reading "= + 2 $\lambda$ bx" should read -- = + 2$\pi$bx--. Column 7, line 7, equation (13), that portion of the equation reading "I = u u" should read --I = u u*--. Column 8, line 23, "FIG. 9 and 10" should read --FIGS. 9 and 10--. Column 10, line 11, "in plane" should read --in place--.

Signed and Sealed this

Eighth Day of March 1977

[SEAL]

Attest:

RUTH C. MASON
*Attesting Officer*

C. MARSHALL DANN
*Commissioner of Patents and Trademarks*